(12) United States Patent
Bland et al.

(10) Patent No.: US 12,083,753 B2
(45) Date of Patent: Sep. 10, 2024

(54) SYSTEM AND METHOD FOR RESIN TRANSFER MOULDING

(71) Applicant: COMPOSITE INTEGRATION LIMITED, Cornwall (GB)

(72) Inventors: Richard Bland, Cornwall (GB); William Harris, Cornwall (GB); Simon Vincent, Cornwall (GB); Oliver Powlesland, Cornwall (GB)

(73) Assignee: COMPOSITE INTEGRATION LIMITED, Cornwall (GB)

( * ) Notice: Subject to any disclaimer, the term of this patent is extended or adjusted under 35 U.S.C. 154(b) by 195 days.

(21) Appl. No.: 16/954,252

(22) PCT Filed: Dec. 18, 2018

(86) PCT No.: PCT/GB2018/053652
§ 371 (c)(1),
(2) Date: Jun. 16, 2020

(87) PCT Pub. No.: WO2019/122840
PCT Pub. Date: Jun. 27, 2019

(65) Prior Publication Data
US 2021/0101351 A1  Apr. 8, 2021

(30) Foreign Application Priority Data

Dec. 18, 2017  (GB) ..................... 1721167

(51) Int. Cl.
*B29C 70/48*   (2006.01)
*B29C 33/38*   (2006.01)
(Continued)

(52) U.S. Cl.
CPC .......... *B29C 70/48* (2013.01); *B29C 33/3807* (2013.01); *B29C 70/06* (2013.01);
(Continued)

(58) Field of Classification Search
CPC ...... B29C 70/48; B29C 70/546; B29C 70/548
See application file for complete search history.

(56) References Cited

U.S. PATENT DOCUMENTS 5,035,602 A * 7/1991 Johnson ............... B29C 70/48
                                                    428/137
5,665,301 A * 9/1997 Alanko ............... B29C 70/443
                                                    425/389
(Continued)

FOREIGN PATENT DOCUMENTS

CN    101545209 A   9/2009
DE    1274339 B     8/1968
(Continued)

OTHER PUBLICATIONS

International Search Report issued in corresponding international application No. PCT/GB2018/053652, Aug. 9, 2019. (7 pages).
(Continued)

*Primary Examiner* — Andrew D Graham
(74) *Attorney, Agent, or Firm* — DAY PITNEY LLP; George N. Chaclas; Anthony A. Kassas

(57) ABSTRACT

Apparatuses, devices, systems 1 and methods for resin transfer moulding of composite articles are disclosed. A mould enclosure enclosing a fibre pack (9) is provided and one or more resin ports (6a-6e) are provided along a resin flow path within the fibre pack (9). Resin ingress into the fibre pack (9) is controlled via valves (44a-44e) or a flow control mechanism (30), each being operable to impose a flow rate on resin passing into the fibre pack (9).

16 Claims, 5 Drawing Sheets

(51) Int. Cl.
  *B29C 70/06* (2006.01)
  *B29C 70/34* (2006.01)
  *B29C 70/44* (2006.01)
  *B29C 70/54* (2006.01)
  *B29C 43/36* (2006.01)

(52) U.S. Cl.
  CPC .......... *B29C 70/342* (2013.01); *B29C 70/443* (2013.01); *B29C 70/546* (2013.01); *B29C 2043/3605* (2013.01)

(56) References Cited

U.S. PATENT DOCUMENTS

| | | | | |
|---|---|---|---|---|
| 5,721,034 A * | 2/1998 | Seemann, III | B29C 70/865 | 428/76 |
| 5,741,450 A | 4/1998 | Monroe | B29C 33/0061 | 264/102 |
| 6,129,311 A * | 10/2000 | Welch | B29D 99/0089 | 244/1 N |
| 6,149,844 A * | 11/2000 | Graham | B29C 70/44 | 425/389 |
| 6,168,408 B1 * | 1/2001 | Boime | B29C 70/546 | 425/149 |
| 6,406,659 B1 * | 6/2002 | Lang | B29C 43/12 | 264/102 |
| 7,147,818 B1 * | 12/2006 | Rigas | B29C 70/443 | 264/102 |
| 8,216,500 B2 * | 7/2012 | Olesen | F03D 1/0675 | 425/111 |
| 10,131,099 B2 * | 11/2018 | Harboe | B29C 31/04 | |
| 10,479,054 B2 * | 11/2019 | Hansen | B29C 70/48 | |
| 2002/0046596 A1 * | 4/2002 | Zhang | G01N 15/0826 | 73/38 |
| 2002/0155186 A1 * | 10/2002 | Walsh | B29C 70/548 | 425/169 |
| 2004/0070114 A1 * | 4/2004 | Filleul | B29C 70/546 | 264/257 |
| 2004/0083065 A1 * | 4/2004 | Daniel | B29C 70/54 | 702/35 |
| 2004/0089975 A1 * | 5/2004 | Sala | B29B 13/022 | 264/328.17 |
| 2004/0130072 A1 * | 7/2004 | Sekido | B29C 70/48 | 264/40.1 |
| 2004/0241262 A1 * | 12/2004 | Huey | B29C 70/84 | 425/110 |
| 2006/0125155 A1 * | 6/2006 | Sekido | B29C 70/68 | 264/511 |
| 2007/0182071 A1 * | 8/2007 | Sekido | B29C 33/0066 | 425/546 |
| 2008/0057150 A1 * | 3/2008 | Harper | B29C 70/48 | 264/238 |
| 2008/0211145 A1 * | 9/2008 | Graham | B29C 70/443 | 264/570 |
| 2009/0115112 A1 * | 5/2009 | Liebmann | B29C 70/443 | 264/510 |
| 2009/0148655 A1 * | 6/2009 | Nies | B29C 70/865 | 156/60 |
| 2011/0046771 A1 * | 2/2011 | Alms | B29C 70/546 | 700/114 |
| 2011/0146896 A1 * | 6/2011 | Schibsbye | B29C 45/0053 | 425/129.1 |
| 2011/0220224 A1 * | 9/2011 | Ellis | F16L 39/06 | 137/561 A |
| 2012/0007269 A1 * | 1/2012 | Olesen | B29C 70/443 | 264/101 |
| 2013/0328236 A1 * | 12/2013 | Yamamoto | B29C 70/48 | 264/257 |
| 2014/0046465 A1 * | 2/2014 | de Oliveira Antunes | B29C 45/77 | 700/97 |
| 2014/0191447 A1 * | 7/2014 | Chiu | B29C 70/48 | 425/585 |
| 2014/0327187 A1 * | 11/2014 | Hurdle | B29C 70/54 | 425/112 |
| 2014/0333008 A1 * | 11/2014 | Harboe | B29C 31/04 | 425/162 |
| 2015/0048546 A1 * | 2/2015 | Yamamoto | B29C 45/14786 | 264/257 |
| 2015/0174835 A1 * | 6/2015 | Hansen | B29C 70/54 | 264/40.7 |
| 2016/0040789 A1 * | 2/2016 | Bestebner | B29C 43/18 | 251/327 |
| 2016/0136905 A1 * | 5/2016 | Filsinger | B29C 70/548 | 425/389 |
| 2016/0167276 A1 * | 6/2016 | Yao | G05B 13/027 | 700/200 |
| 2017/0157804 A1 * | 6/2017 | Takemoto | B29C 37/0028 | |
| 2017/0190078 A1 * | 7/2017 | Witte | B29C 70/44 | |
| 2017/0312997 A1 * | 11/2017 | Usui | B29C 39/44 | |
| 2017/0368719 A1 * | 12/2017 | Jones | B29C 70/54 | |
| 2018/0056612 A1 * | 3/2018 | Nesbit | B29C 70/443 | |
| 2018/0186043 A1 * | 7/2018 | Minogue | B29C 70/305 | |
| 2018/0274615 A1 * | 9/2018 | Fiala | F16D 69/02 | |
| 2021/0101351 A1 * | 4/2021 | Bland | B29C 70/48 | |

FOREIGN PATENT DOCUMENTS

| | | |
|---|---|---|
| EP | 2030763 A1 | 3/2009 |
| EP | 3075525 A1 | 10/2016 |
| JP | H01-242219 A | 9/1989 |
| JP | H07-9533 A | 1/1995 |
| JP | 2004174776 A | 6/2004 |
| JP | 2008114418 A | 5/2008 |
| JP | 2009255472 A | 11/2009 |
| KR | 20110072080 A | 6/2011 |
| KR | 20110121345 A | 11/2011 |
| KR | 20120130835 A | 12/2012 |
| WO | 2014006131 A2 | 1/2014 |

OTHER PUBLICATIONS

Written Opinion of the International Searching Authority issued in corresponding international application No. PCT/GB2018/053652, Aug. 9, 2019. (12 pages).

Combined Search and Examination Report under Sections 17 & 18(3) issued in priority application No. GB 1721167.3, Jun. 13, 2018. (5 pages).

Combined Search and Examination Report under Sections 17 & 18(3) issued in priority application No. GB 1721167.3, Jun. 3, 2019. (6 pages).

Combined Search and Examination Report under Sections 17 & 18(3) issued in related application No. GB 1820590.6, Jun. 19, 2019. (6 pages).

Kang et al. "Analysis of resin transfer moulding process with controlled multiple gates resin injection", Composites Part A: Applied Science and Manufacturing, 31:5, 407-422, May 1, 2000. Abstract only (3 pages).

* cited by examiner

SYSTEM AND METHOD FOR RESIN TRANSFER MOULDING

CROSS-REFERENCE TO RELATED APPLICATIONS

This application is a U.S. National Stage of International Application No. PCT/GB2018/053652, filed on 18 Dec. 2018 and published on 27 Jun. 2019, as WO 2019/122840 A12 which claims the benefit of priority to UK Patent Application No. GB 1721167.3, filed on 18 Dec. 2017. The content of each of the above referenced patent applications is incorporated herein by reference in its entirety for any purpose whatsoever.

FIELD OF THE INVENTION

The present invention relates to methods, devices and systems for resin transfer moulding. In particular the invention relates to methods, devices and systems for the resin transfer moulding of articles constructed from composite materials containing carbon fibre, glass fibre or other fibre types. Moreover, the invention is particularly applicable to vacuum-assisted resin transfer moulding, especially of relatively large articles such as boat hulls.

BACKGROUND TO THE INVENTION

There are many moulding techniques that can be used to form articles such as boat hulls, wind turbine blades, aerospace and vehicle components, from composite materials. Naming conventions vary in this technical field, but generally, resin transfer moulding (RTM), refers to the driving of liquid thermosetting resin through a permeable substrate. The substrate is typically composed a web of fibres such as carbon fibre, or fibre-glass, and often referred to in the art as a fibre pack. Such moulding techniques encapsulate the permeable substrate within a mould enclosure defined by lower and upper mould tools. If one of those tools defining a mould enclosure is flexible, then the term "resin infusion" is often used. Nonetheless, resin transfer moulding (RTM) will be used hereinafter as the generic term for all such techniques.

Resin is driven by applying a pressure differential, typically through the use of a resin pump and/or a vacuum pump. When resin is driven through a substrate using a vacuum pump, this is normally incorporated into the name of the moulding technique, for example "vacuum-assisted resin transfer moulding"—commonly abbreviated to VARTM.

The present invention has particular applicability to a specific VARTM technique wherein the upper tool takes the form of a layer of flexible sheeting. This is typically done to reduce tooling costs, especially for the production of large articles. The upper tool together with the lower tool forms a sealed mould enclosure around the fibre pack. Air is pumped out from the interior of the mould enclosure via one or more evacuation ports, and so the flexible sheeting is drawn towards the lower mould tool, and is urged against the fibre pack. So long as the interior of the enclosure is maintained at a negative pressure relative to atmospheric pressure external to the enclosure, the fibre pack is held tightly in position against the lower mould tool. Resin is introduced into the mould enclosure via a resin port distal from the evacuation ports, and so seeps into and throughout the porous fibre pack, drawn towards the evacuation ports.

In some VARTM processes, only a vacuum is used to draw the resin through the fibre. In others, a resin pump can also be used to actively drive resin into the mould. In this latter case, it is necessary for resin to be introduced into the mould enclosure at a flow rate that maintains the negative pressure within the mould enclosure established by the vacuum. This is so that the sheeting remains urged against the fibre pack. In this way, the specific shape and form of the article can be precisely controlled.

The resin flow rate cannot rise to a level at which the negative pressure within the enclosure is lost such that the sandwiched fibre pack is no longer compacted.

Accordingly, the resin pump output must be controlled to maintain an acceptable flow rate.

It is against this background that the present invention has been conceived.

SUMMARY OF THE INVENTION

According to a first aspect of the present invention there is provided a system for resin transfer moulding of composite articles. The system may comprise at least one of a mould enclosure, a fibre pack, a plurality of resin ports, a plurality of valves, a plurality of valve control mechanisms and a controller.

Preferably, the mould enclosure encloses the fibre pack.

Preferably, the plurality of resin ports are distributed across the mould enclosure.

Preferably, the resin ports are spaced from one another and/or positioned in a sequence along a resin flow path within the fibre pack.

Preferably, each valve is arranged to control resin ingress into the fibre pack through a respective resin port.

Preferably, each valve control mechanism is arranged to receive a respective valve control signal and in response operate a corresponding one of the valves.

Preferably, the controller is configured to transmit valve control signals to each of the valve control mechanisms. The controller may be configured to transmit valve control signals so as to:

prior to the start of a first period of a resin transfer process, close each of the valves to prevent resin ingress of resin into the fibre pack via the resin ports;

at the start of the first period of the resin transfer process, open a first of the valves corresponding to a first resin port located at the start of the resin flow path to permit ingress of resin into the fibre pack via the first resin port; and/or after the end of the first period of the resin transfer process, open at least another of the valves to permit resin ingress into the fibre pack via at least another of the resin ports positioned subsequent to the first resin port in the sequence, resin ingress via each subsequent resin port being in order of the position in the sequence of that resin port along the resin flow path.

Preferably, the controller is arranged to delay ingress of resin via each subsequent resin port. Preferably, the controller is arranged to delay ingress of resin via each subsequent resin port until the controller determines that a resin front originating from the first resin port in the sequence, and progressing along the resin flow path through the fibre pack during the resin transfer process, has substantially reached or surpassed the position of that subsequent resin port in the sequence.

Preferably, the controller determines a position of the resin front relative to one or more subsequent resin ports by determining at least one resin spread parameter. The at least one resin spread parameter may include: time elapsed relative to the start of the first period of the resin transfer process; resin flow rate; fibre volume between adjacent resin ports; and/or fibre density.

Preferably, the system comprises at least one resin spread detector for detecting spread of resin within the fibre pack. Preferably, the at least one resin spread detector is arranged to communicate resin spread data to the controller.

Preferably, the resin spread data indicates the detected position of resin relative to the position of each subsequent resin port. Preferably, the controller is arranged to use the resin spread data to make a determination whether a resin front has substantially reached and/or surpassed the position of a resin port.

Preferably, the at least one resin spread detector comprises a camera system. Preferably, the camera system has at least one image detector positioned and arranged relative to the mould enclosure to detect the presence of resin within it, and thereby determine the location of the resin front.

Preferably, the mould enclosure comprises a transparent or translucent mould tool. Advantageously, the at least one image detector is able to visually discriminate between dry and wet regions of the fibre pack through the mould tool.

Preferably, the at least one resin spread detector comprises one or more capacitive sensors. Preferably, the capacitive sensors are positioned adjacent to the mould enclosure along the resin flow path at predetermined locations relative to one or more subsequent resin ports.

Preferably, the system comprises one or more pressure sensors. Preferably, the at least one resin spread detector comprises one or more pressure sensors. Preferably, the one or more pressure sensors are positioned at predetermined locations relative to one or more subsequent resin ports. Preferably, the one or more pressure sensors bridge the interior and exterior of the mould enclosure so as to detect a pressure differential between the interior and the exterior of the mould enclosure.

Preferably, the system comprises a manifold. Preferably, the manifold comprises the plurality of valves and a body. Preferably, the body defines at least one of a resin inlet, a plurality of resin outlets and an internal resin chamber. The internal resin chamber may be between the resin inlet and at least one of the resin outlets. Preferably, each resin outlet is fluidly coupled to a corresponding one of the resin ports.

Preferably, each valve is arranged to control flow of resin between the internal resin chamber and a corresponding one of the outlets. Accordingly, resin ingress into the fibre pack through a respective one of the resin ports may thereby be controlled.

Preferably, each valve comprises a valve head and a valve seat which are moveable relative to one another. Preferably, the valve head and the valve seat are slidable relative to one another along a valve axis. Relative movement between the valve head and the valve seat can control flow between the internal resin chamber and a corresponding one of the outlets. Preferably, abutment of the valve head and the valve seat stops flow. Preferably, separation of the valve head and the valve seat permits flow. Preferably, the extent of separation of the valve head and the valve seat is proportional to the size of the opening between the internal resin chamber and a corresponding one of the outlets. Accordingly, the flow of fluid such as resin between the internal resin chamber and a corresponding one of the outlets may be proportional to the extent of separation of the valve head and the valve seat.

Preferably, at least one of the valve head and the valve seat of a respective valve is reattachably detachable from the body of the manifold. Preferably, detachment from the body is by withdrawing the valve head and/or valve seat from the body, ideally by moving it along the valve axis.

Preferably, the manifold is formed from a plurality of modules that are detachably attachable to one another. Preferably, the manifold is formed from a plurality of modules that are sealable to one other via cooperating interfaces. Ideally, each module comprises at least one of a respective resin outlet, a corresponding valve, and a section of the body defining the internal resin chamber.

Preferably, the manifold further comprises a manifold pressure sensor. The manifold pressure sensor may be arranged to register the pressure within the internal resin chamber. Preferably, the manifold pressure sensor is arranged to communicate the registered pressure to the controller. In response, the controller may be configured to transmit valve control signals to regulate the flow of resin into the fibre pack via the plurality of valves.

Preferably, at least one of the valve control mechanisms is arranged to receive a respective valve control signal and in response operate a corresponding one of the valves to maintain it in a fully open state, a fully closed state, or at least one partially open state. The at least one partially open state can thereby restrict resin flow via that valve relative to the fully open state. Advantageously, this can provide a more precise control of flow of resin into the fibre pack.

Preferably, the or each valve is maintainable in a plurality of partially open states.

Preferably, the or each valve is substantially continuously variable between the fully-closed and fully-open states.

Preferably, the first resin port is positioned at a central location relative to the overall mould enclosure. Ideally, this is such that the resin flow path extends radially outward from the first resin port to a periphery of the fibre pack.

Preferably, the first resin port is positioned at a nadir of the mould enclosure. Ideally, this is such that the resin flow path extends substantially upward, forcing resin flowing into the fibre pack during the resin transfer process to flow against the force of gravity.

Preferably, the system comprises an evacuation port located at a periphery of the fibre pack. Preferably, the evacuation port is coupled to a vacuum pump. The vacuum pump may be operable during the resin transfer process to evacuate air from the mould enclosure to establish a negative pressure therein relative to an external pressure external to the enclosure.

Preferably, the mould enclosure is defined, at least in part, by a pair of mould tools. Preferably, the pair of mould tools are moveable toward one another under action of the negative pressure established within the mould enclosure to compress the fibre pack.

Preferably, the controller is arranged to determine a pressure state within the mould enclosure and in response transmit valve control signals to control resin ingress into the fibre pack at a flow rate that substantially maintains the negative pressure within the mould enclosure.

Preferably, the controller is in communication with the vacuum pump and thereby determines the pressure state within the mould enclosure.

Preferably, the controller is in communication with one or more pressure sensors. Preferably, the pressure sensors bridge the interior and exterior of the mould enclosure thereby determining the pressure state within the mould enclosure.

Preferably, the system comprises a resin pump (or a resin pumping machine). Preferably, the resin pump is arranged to pump resin into the mould enclosure via the respective plurality of resin valves and ports.

Preferably, the controller is in communication with the resin pump and thereby determines the pressure and/or flow rate of the resin passing via one or more of the valves into the mould enclosure. Preferably, the controller is arranged to control the resin pump.

Accordingly, the controller can regulate ingress of resin pumped by the resin pump into the fibre pack within the mould enclosure.

Preferably, the system comprises a solvent pump. Preferably, the system has a cleaning configuration in which the solvent pump drives cleaning solvent from a solvent store, via the plurality of valves to a solvent waste tank. Advantageously, this can prevent resin curing within the valves and so can maintain the functioning of the valves, such as their ability to open and close.

Preferably, the controller is configured to transmit valve control signals to each of the plurality of valve control mechanisms so as to open and close the valves in a manner that concentrates flow of cleaning solvent through each of the valves during a solvent flushing operation.

Preferably, the controller is configured to transmit valve control signals to each of the plurality of valve control mechanisms so as to progressively open a previously-closed valve at the same time as progressively closing a previously-open valve.

Preferably, the controller is in communication with the solvent pump to control solvent pumping by the solvent pump.

Preferably, the system comprises a mixing chamber arranged, during the resin transfer process, to receive and mix together an uncured resin and a hardener to thereby output resin suitable for transfer into the fibre pack. Preferably, when the system is in the cleaning configuration, the solvent pump is arranged to drive cleaning solvent from the solvent store via the mixing chamber.

The system may comprise a resin port positioned at a start of a resin flow path within the fibre pack.

The system may comprise an evacuation port located at an end of the resin flow path within the fibre pack.

The system may comprise a flow control apparatus for controlling flow of resin into the mould enclosure.

Preferably, air can be evacuated from the mould enclosure via the evacuation port to establish a negative pressure within the mould enclosure relative to an external pressure external to the enclosure.

Preferably, the flow control apparatus comprises a resin output. Preferably, the resin output is fluidly coupled to the or each resin port. Accordingly, resin can flow from the resin output into the mould enclosure during a resin transfer process. Preferably, this is under action of said negative pressure within the mould enclosure.

Preferably, the flow control apparatus is operable to impose a flow rate on resin passing via the resin output. Preferably, the flow control apparatus is operable to impose a negative, zero and/or positive flow rate on resin passing via the resin output.

Preferably, the flow control apparatus comprises a container and a gas pump. The container may be arranged, in use, to contain a volume of resin, the container defining a headspace for containing a volume of gas above the volume of resin.

The gas pump may be coupled to the headspace. The gas pump is operable to change the pressure of the volume of gas contained within the headspace. Thus, in use, it is possible to thereby control flow rate of resin passing via the resin output.

Preferably, the gas pump comprises an air compressor operable to increase the pressure of the volume of gas contained within the headspace above an external pressure. Preferably, the gas pump comprises a vacuum device operable to decrease the pressure of the volume of gas contained within the headspace below an external pressure.

Preferably, the flow control apparatus further comprises a resin input via which the volume of resin within the container can be replenished. As mentioned, the system may comprises a resin pump, and this may be fluidly coupled to the resin input. The resin pump can be arranged, in use, to pump resin into the container.

The controller may be configured to transmit flow control signals to the flow control apparatus. The flow control apparatus may be configured to receive the flow control signals, and set the flow rate on resin passing via the resin output in dependence on said flow control signals.

The controller may be configured to determine a pressure state within the mould enclosure and in response transmit flow control signals to the flow control apparatus so that resin ingress into the fibre pack is maintained at a flow rate that substantially maintains the negative pressure within the mould enclosure.

Preferably, the flow control apparatus comprises a gas pressure sensor arranged and configured to measure the pressure of gas within the headspace of the container. Ideally, the controller is in data communication with the gas pressure sensor to determine the pressure of gas within the headspace of the container. Moreover, the controller is ideally configured to transmit flow control signals to the flow control apparatus in dependence on the determined pressure of gas within the headspace of the container.

Preferably, the controller is configured to determine a pressure state within the mould enclosure, and also the pressure of gas within the headspace of the container, and transmit to the flow control apparatus flow control signals that maintains the enclosure pressure at a more negative pressure than that of the headspace.

The flow control apparatus may be configured to operate the gas pump in dependence on the received flow control signals. If the flow control signals include a request to decrease the flow rate, the flow control apparatus is configured to operate the gas pump to reduce the gas pressure within the headspace. If the flow control signals include a request to increase the flow rate, the flow control apparatus is configured to operate the gas pump to increase the gas pressure within the headspace.

According to a second aspect of the present invention there is provided a method for resin transfer moulding of composite articles. Preferably, the method comprising at least one of:

forming a mould enclosure around a fibre pack;
distributing a plurality of resin ports across the mould enclosure, the resin ports being spaced from one another and positioned in a sequence along a resin flow path within the fibre pack;
prior to the start of a first period of the resin transfer process, under control of a controller, preventing ingress of resin into the fibre pack via the plurality of resin ports;
at the start of the first period of the resin transfer process, under control of the controller, permitting ingress of resin into the fibre pack via a first resin port of the plurality of resin ports, the first resin port being positioned first in the sequence at the start of the resin flow path; and after the end of the first period of the resin transfer process, under control of the controller, permitting ingress of resin into the fibre pack via at least another of the plurality of resin ports positioned subsequent to the first resin port in the sequence, resin ingress via each subsequent resin port being in order of the position in the sequence of that resin port along the resin flow path.

Preferably, the method comprises delaying resin ingress via each subsequent resin port until a determination is made that a resin front originating from the first resin port in the sequence, and progressing along the resin flow path through the fibre pack during the resin transfer process, has substantially reached or surpassed the position of that subsequent resin port in the sequence.

The method may comprise at least one of:
evacuating air from the mould enclosure to establish a negative pressure inside the mould enclosure;
monitoring, using a pressure sensor, the pressure inside the mould enclosure; and
controlling, using a flow control apparatus, the flow of resin via a resin port (or each of the plurality of resin ports) into the fibre pack in dependence on the monitored pressure inside the mould enclosure.

Preferably, resin is supplied from a container containing a volume of resin that is fluidly coupled to the or each resin port.

Preferably, the container contains a volume of gas in fluid communication with the volume of resin so that the pressure of the volume of gas influences the rate of flow of resin from the container, via the or each resin port, into the fibre pack.

Preferably, the step of controlling the flow of resin comprises controlling the pressure of the volume of gas within the container.

Preferably, controlling the pressure of the volume of gas within the container comprises operating a gas pump to increase or decrease the pressure of the volume of gas contained within the headspace.

According to a third aspect of the present invention there is provided a manifold for use in a system for resin transfer moulding of composite articles. Preferably, the manifold comprises a body and a plurality of valves. Preferably, the body of the manifold defines a resin inlet, a plurality of resin outlets and an internal resin chamber therebetween, and each valve is arranged to control flow between the internal resin chamber and a corresponding one of the outlets.

Preferably, each valve comprises a valve head and a valve seat which are slidable relative to one another along a valve axis to control flow between the internal resin chamber and a corresponding one of the outlets, with abutment of the valve head and the valve seat stopping flow, and the extent of separation of the valve head and the valve seat being proportional to the size of the opening between the internal resin chamber and a corresponding one of the outlets.

Preferably, at least one of the valve head and the valve seat of a respective valve is reattachably detachable from the body of the manifold by withdrawing the valve head and/or valve seat from the body by moving it along the valve axis. Advantageously, this arrangement benefits the cleaning of the manifold and restoration of it in the event that resin unintentionally cures to prevent movement of other moveable parts (such as the valve head and/or valve seat). Specifically, detachment can break the link formed by unintentionally-cured resin between such a moveable part and a non-moving part of the manifold, or otherwise permit improved maintenance access.

Preferably, the manifold is formed from a plurality of modules that are detachably attachable and sealable to one other via cooperating interfaces. Preferably, each module comprises a respective resin outlet, a corresponding valve, and a section of the body defining the internal resin chamber.

Preferably, the manifold further comprises a manifold pressure sensor for registering the pressure within the internal resin chamber, the manifold pressure sensor being arranged to communicate the registered pressure to a controller.

Preferably, the manifold is coupled and/or in communication with any one or combination of components of the system for resin transfer moulding of composite articles of the first aspect of the present invention.

According to a fourth aspect of the present invention there is provided a controller for use in a system for the resin transfer moulding of composite articles. Preferably, the controller is for use with the system according to the first aspect of the present invention.

Preferably, the controller is configured to transmit valve control signals to a plurality of valve control mechanisms of the system. This may be so that:
prior to the start of a first period of a resin transfer process, the valve control signals may instruct each valve control mechanism to close an associated valve;
at the start of the first period of the resin transfer process, the valve control signals may instruct a first of the valve control mechanisms to open a corresponding first valve; and
after the end of the first period of the resin transfer process, the valve control signals may instruct at least another of the valve control mechanisms to open a corresponding valve.

According to a fifth aspect of the present invention there is provided a flow control apparatus for use in a system for the resin transfer moulding of composite articles.

Preferably, the flow control apparatus comprises a container having a resin output, the container being arranged to contain a volume of gas in a headspace above a volume of resin that is fluidly couplable via the resin output to a resin port of a mould enclosure.

Preferably, the flow control apparatus comprises a gas pump coupled to the headspace, the gas pump being operable to change the pressure of the volume of gas contained within the headspace thereby controlling flow rate of resin passing via the resin output.

It will be understood that features and advantages of different aspects of the present invention may be combined or substituted with one another where context allows.

For example, the features and components of the system described in relation to the first aspect of the present invention, together with their respective functions may be provided as part of the method described in relation to the second aspect of the present invention.

For example, the method may comprise providing at least one of a resin spread detector, a controller, pressure sensors, a manifold, a resin pump, flow control apparatus and a solvent pump, and moreover the method may comprise performing the functions of such components as described in relation to the first aspect.

Furthermore, such features may themselves constitute further aspects of the present invention. For example, the features of the resin spread detector, the controller, the pressure sensors, the manifold, the resin pump, flow control apparatus or the solvent pump may themselves constitute further aspects of the present invention.

BRIEF DESCRIPTION OF THE DRAWINGS

In order for the invention to be more readily understood, embodiments of the invention will now be described, by way of example only, with reference to the accompanying drawings in which.

SPECIFIC DESCRIPTION OF THE PREFERRED EMBODIMENTS

Figure 1:
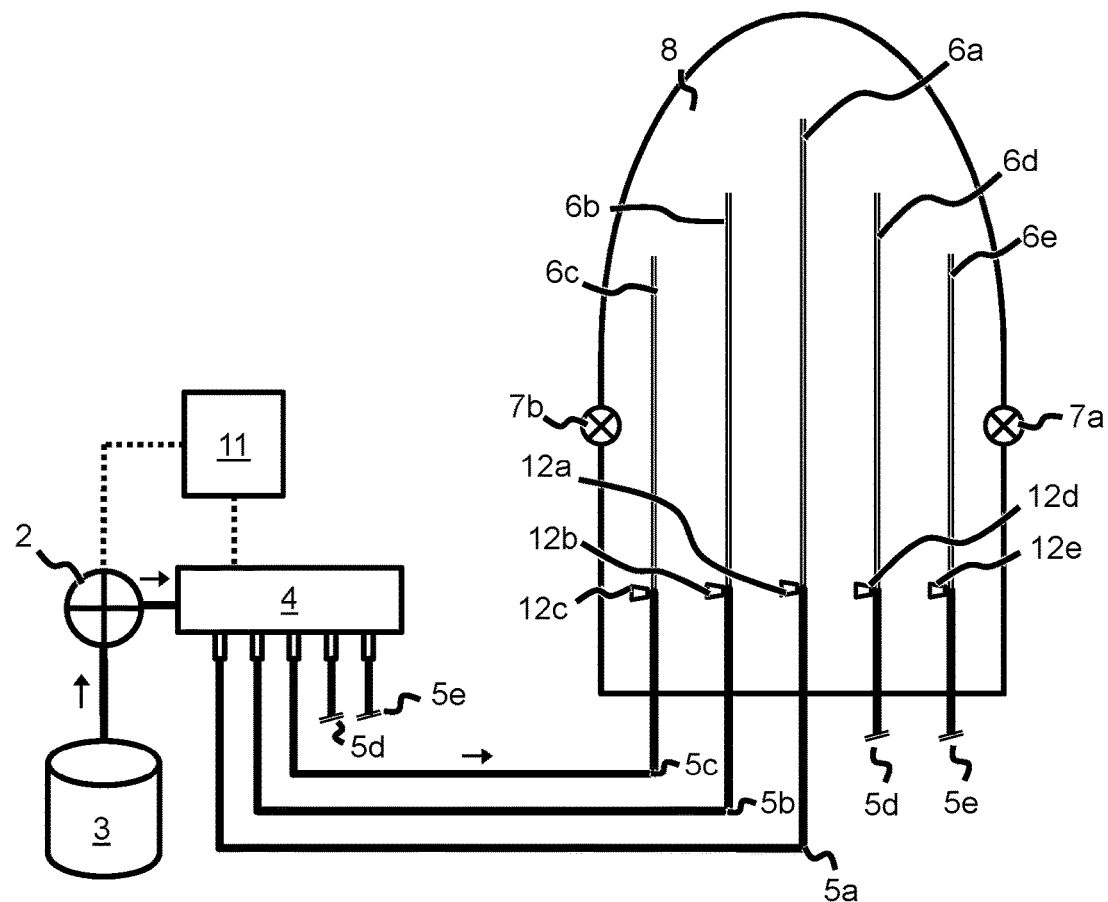
FIG. 1 is a schematic view of a resin transfer system at the start of a resin transfer process to produce a boat hull, the boat hull shown from an overhead perspective, the system and process according to a first embodiment of the present invention.

FIGS. 1, 3, 5 and 7 are schematic views of a resin transfer system according to a first embodiment of the present invention. In this embodiment, the system is for the vacuum-assisted resin transfer moulding of an fibreglass article in the form of a boat hull. In FIGS. 1, 3, 5 and 7, an overhead view of the boat hull to be moulded is shown, whereas in FIGS. 2, 4, 6 and 8, a schematic cross-sectional view of the boat hull of FIG. 1 is shown.

Figure 2:
FIG. 2 is a partial schematic view of the resin transfer system of FIG. 1 at the start of the resin transfer process, wherein the boat hull is shown in schematic cross-section.
Figure 3:
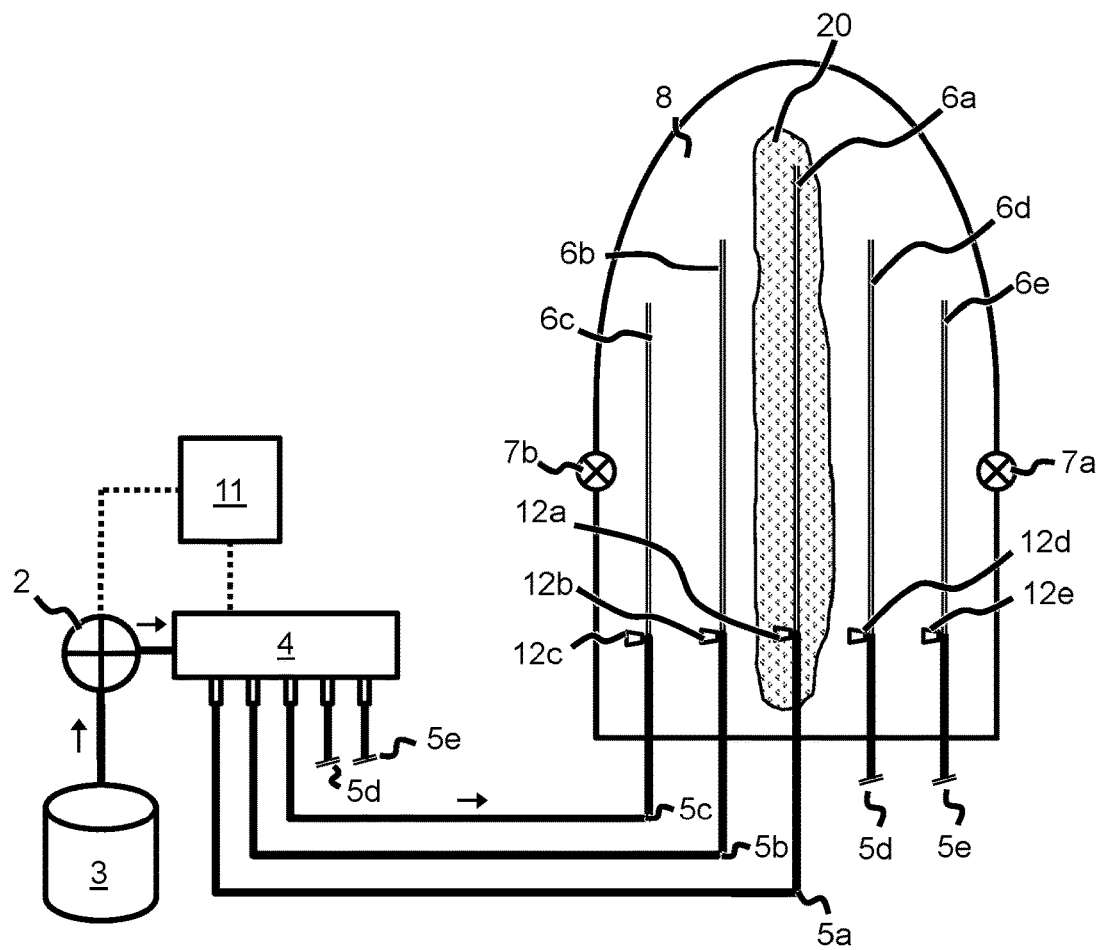
FIGS. 3, 5 and 7 are the same schematic views of the system as FIG. 1, but respectively show the system at the end of a first, second and third period of the resin transfer process.
Figure 4:
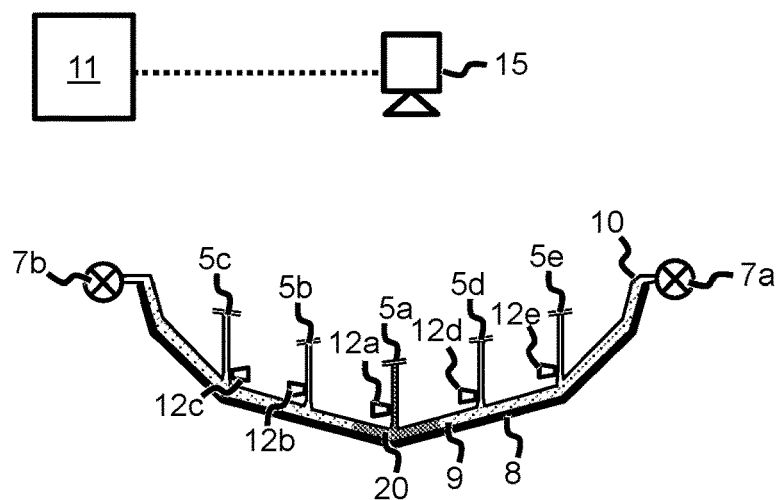
FIGS. 4, 6 and 8 are the same schematic views of the system as FIG. 2, but respectively show the system at the end of a first, second and third period of the resin transfer process.
Figure 5:
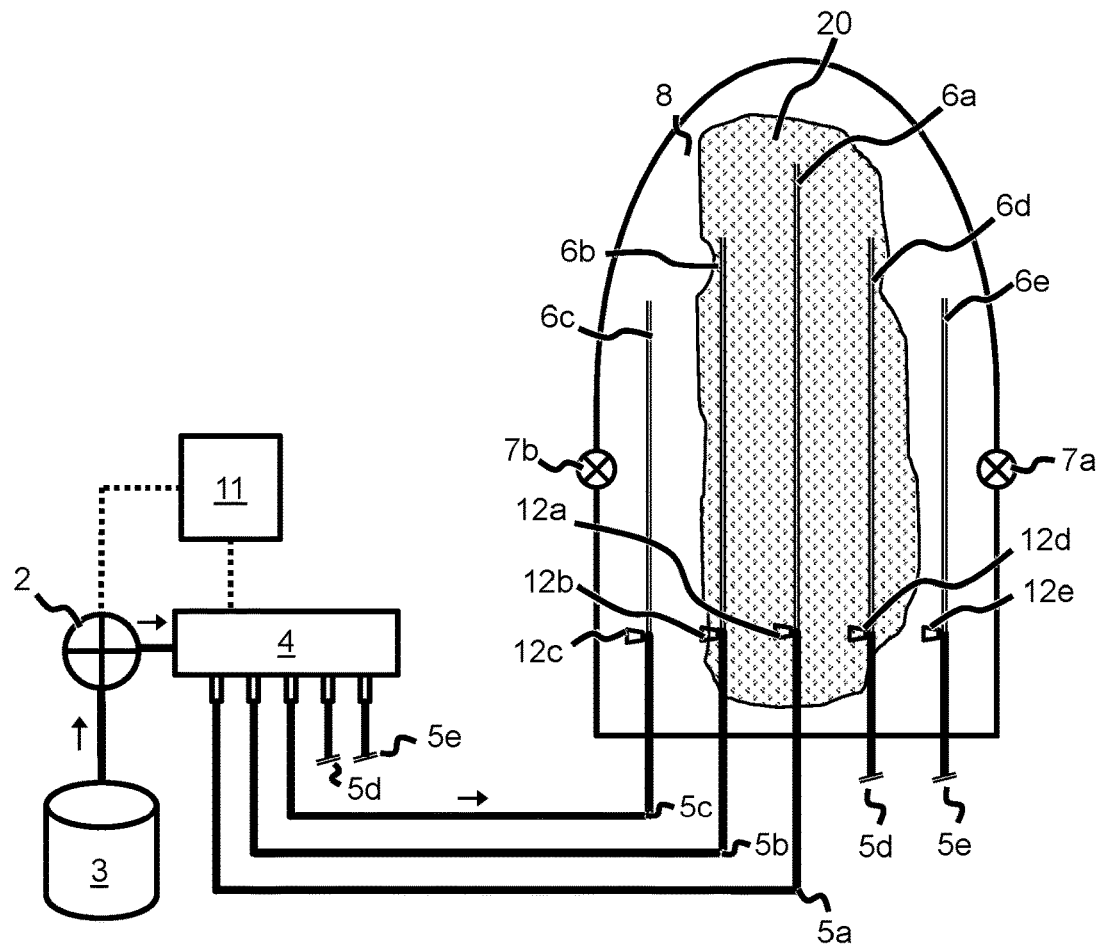
Figure 6:
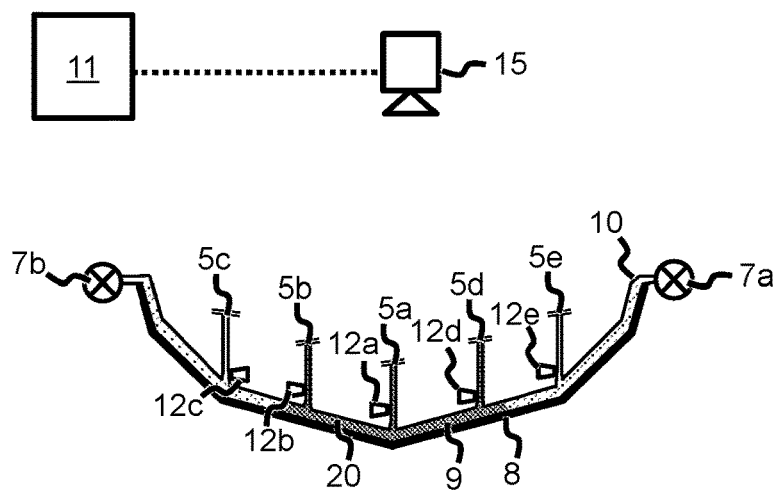

The progression of a resin transfer process by the system is schematically depicted, with FIGS. 1 and 2 both representing the same point in time at the start of a first period of the resin transfer process. FIGS. 3 and 4 together represent the state of the system at the end of the first period of the resin transfer process; FIGS. 5 and 6 together represent the state of the system at the end of a second period of the resin transfer process; and FIGS. 7 and 8 together represent the state of the system at the end of a third period of the resin transfer process. In the present embodiment, the resin transfer process comprises four periods lasting approximately the same amount of time as one another.

With reference to FIGS. 1 and 2, the system 1 comprises a resin pumping machine 2, a resin store 3, a manifold 4, a plurality of resin feed lines 5a-5e, a plurality of elongate resin ports 6a-6e, evacuation ports 7a, 7b, a lower mould tool 8, a fibre pack 9, translucent flexible sheeting 10, a controller 11, a plurality of resin feed line pressure sensors 12a-12e, and a resin spread detector 15.

The flexible sheeting 10 and the mould tool 8 together substantially define a generally air-impermeable mould enclosure within which the fibre pack 9 is enclosed. Interrupting the mould enclosure are the resin ports 6a-6e via which resin is fed into the enclosure, and also evacuation ports 7a, 7b, which are coupled to one or more vacuum pumps (not shown) via which air is evacuated from the mould enclosure during the resin transfer process.

Each of the elongate resin ports 6a-6e are fluidly coupled by a respective resin feed line 5a-5e to the manifold 4. Moreover, each resin feed line 5a-5e is independently coupled to respective resin outlets of the manifold 4 such that flow of resin in each resin feed line 5a-5e can be independently controlled from the manifold 4 as will be discussed in greater detail below. The manifold is fluidly coupled to the resin pumping machine 2 which in turn is fed by the resin store 3.

The resin store 3 independently contains an uncured resin and a hardener which are each drawn by the resin pumping machine 2. The resin pumping machine 2 is configured to mix the uncured resin and hardener together in the appropriate quantities, and in dependence on the specific resin and hardener, as is known to those skilled in the art. To this end, the resin pumping machine 2 comprises a first fluid channel for the uncured resin, and a second fluid channel for the hardener (also known in the art as a "catalyst"), and a mixing chamber. The resin pumping machine 2 is arranged to meter uncured resin and hardener at the appropriate flow rates and/or pressures through a respective one of the first and second fluid channels, to the mixing chamber, and then output the resulting mixture to the manifold 4. For the avoidance of doubt, the mixture is generally referred to herein simply as "resin", and this denotes a suitable mixture of uncured resin and hardener which, over a certain period, will cure and harden, but remains fluid for a period that is sufficiently long enough to infuse it into the fibre pack 9 to form the composite article. Such resin pumping machines, their features and operation are well-known in the art, and a series of them are commercial available from the original Applicant, Composite Integration Limited, under the Ciject® brand.

The controller 11 is in electronic communication with the resin pumping machine 2, and issues the machine 2 with instructions to control its operation. In particular, the controller 11 is configured to control the flow of resin pumped out from the resin pumping machine 2 to the manifold 4, for example by controlling the flow rate or pressure of the resin outputted by the machine 2. It will be appreciated that whilst the controller is shown schematically as a separate unit from the resin pumping machine 2, its functionality may be provided, at least in part, via a control module integrated the resin pumping machine 2.

Figure 9:
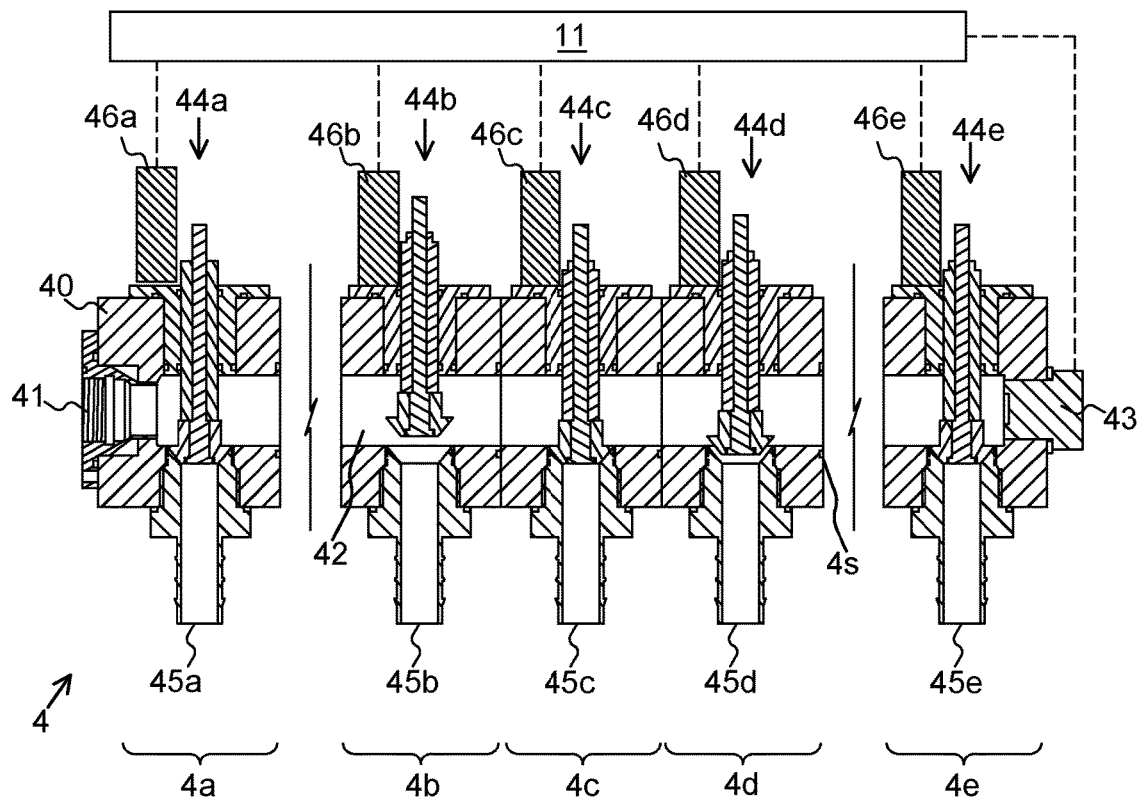
FIG. 9 is a cross-sectional schematic view of a manifold of the resin transfer system according to the first embodiment.

FIG. 9 is a cross-sectional schematic view of the manifold 4 of the resin transfer system 1 of FIGS. 1 and 2. The manifold 4 comprises a generally elongate body 40 which defines a single resin inlet 41 at one axial extremity, an internal resin chamber 42, and five resin outlets 45a, 45b, 45c, 45d, 45e. The manifold 4 also comprises a corresponding five valves 44a, 44b, 44c, 44d, 44e, and a corresponding five valve control mechanisms 46a, 46b, 46c, 46d, 46e. A manifold pressure sensor 43 is located at the other axial extremity, distal from the resin inlet 41. As shown in FIG. 9, the body 40 of the manifold is, in use, generally oriented horizontally, with the resin outlets depending from the underside of the manifold 4.

The manifold 4 is schematically depicted in FIG. 9 to be separated into three sections: a section adjacent to the resin inlet 41, a centrally-disposed section, and a section adjacent to the manifold pressure sensor 43. However, it will be understood that these three sections are in actuality joined to one another, and the schematic depiction merely indicates the modular nature of the manifold 4. In the present embodiment, the manifold 4 consists of a chain of five modules, each module having a resin outlet, a valve and a valve control mechanism. However, the separation of the modules that is shown schematically in FIG. 9 serves to indicate that more, or fewer modules may be provided in other embodiments. In use, each module is attached to at least one other module via cooperating interfaces which seal the modules to one another to together form the manifold 4. To this end a seal 4s is provided on or between each cooperating structure, the seal ensuring that fluid cannot leak out from between two abutting and securely attached modules of the manifold 4.

The section of the manifold adjacent to the resin inlet 41 hosts a first module of said five modules. The first module 4a comprises a first resin outlet 45a of the plurality of resin outlets, a first valve 44a of the plurality of valves, and a first valve control mechanism 46a of the plurality of valve control mechanisms. A second module 4b, third module 4c and fourth module 4d are hosted by the centrally-disposed section, and have respective second, third and fourth resin outlets 45b, 45c, 45d of the plurality of resin outlets; second, third and fourth valves 44b, 44c, 44d of the plurality of valves; and second, third and fourth valve control mechanisms 46b, 46c, 46d of the plurality of valve control mechanisms. Similarly a fifth module 4e, hosted by the section of the manifold 4 adjacent to the manifold pressure sensor 43 comprises the fifth resin outlet 45e, fifth valve 44e, and fifth valve control mechanism 46e.

Each module 4a-4e also comprises a corresponding segment of the manifold body 40 and thus a segment of the chamber 42 defined by the body 40.

The second, third and fourth modules 4b, 4c, 4d of the centrally-disposed section are substantially identical in structure to one another, and have cooperating interfaces to allow them to be combined with one another. The first and fifth modules, which are located at the extremities of the manifold, differ to account for the presence of the resin inlet 41, and the manifold pressure sensor 43 respectively. Specifically, the segment of the manifold body 40 of the first module 4a has, at one end, a threaded fitting to allow connection of a resin inlet pipe (not shown). In comparison, the segment of the manifold body 40 of the fifth module 4e has at one end a fitting to allow connection of the manifold pressure sensor 43. At their other ends, the first and fifth modules 4a, 4e have cooperating interfaces to allow them to be combined with the intermediate chain of modules 4b, 4c, 4d.

Figure 10:
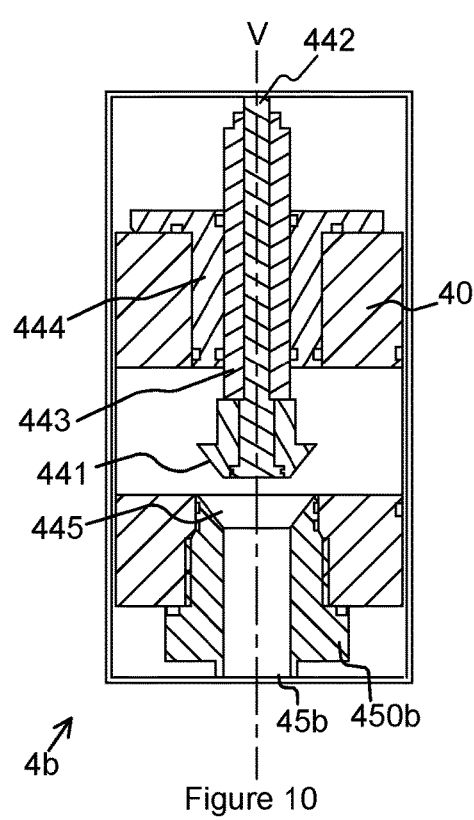
FIG. 10 is an enlarged partial view of the manifold of FIG. 9.

FIG. 10 is an enlarged partial view of the second module 4b of the manifold 4 of FIG. 9. The second valve 44b is part of a valve assembly that generally extends in a direction that extends transverse to the elongate body 40 of the manifold 4, and so is generally vertically-oriented in use of the manifold 4. Moreover, the valve assembly is generally centred on a longitudinal valve axis V along which the valve is moveable to regulate flow of resin through the respective resin outlet 45b.

The valve assembly comprises a valve head 441, a valve core 442, a valve shaft 443, a valve base 444, and a valve seat 445.

The valve head 441 comprises an annular collar from which axially depends an integrally-formed frustoconical tip. The inclined outer surface of the tip is shaped to conform to the complementarily-shaped valve seat 445 such that abutment of the valve head 441 and valve seat 445 closes the valve, and prevents resin flow from the resin chamber 42 out of the resin outlet 45b. The valve head 441 defines an internal threaded bore which cooperates with a complementary external threaded surface of a cylindrical body portion of the valve core 442, allowing these two components to be assembled to one another. The valve core 442 further comprises a flanged tip which limits the position of the valve head 441 along the threaded surface of the valve core 442 during assembly, thereby ensuring reliable positioning of the valve head 441 to the valve core 442 during assembly. The valve core 442 also comprises a cylindrical tail portion, which is radially narrower than the body portion, but is also externally threaded. This cooperates with an internal thread of a central bore of the valve shaft 443 to allow the valve shaft 443 and valve core 442 to be securely engaged to one another during assembly. The tail portion, body portion and tip of the valve core 442 are integrally formed from a unitary piece of material.

The valve head 441, shaft 443 and core 442 when assembled together form a piston which is slidable within a cylindrical bore of the valve base 444. The valve base 444 itself is approximately T-shaped in cross-section, having a cylindrical trunk surmounted by, and integrally-formed with an annular hat. The valve base 444 is fitted within a complementarily-shaped and sized cylindrical bore defined within the body 40 of the manifold 4, with the hat of the valve base 444 limiting the depth of insertion into the body 40. When fully inserted, a lower end of the valve base 444 is approximately level with a surrounding roof portion of the resin chamber 42 defined by the body 40. Resilient fluid seals are housed within seal recesses formed within confronting surfaces of the components of valve assembly, the seals being compressed when those components are assembly to one another to seal against fluid leakage. Moreover, the sealing is maintained even during relative movement of the components, such as the sliding of the piston relative to the valve base 444. The valve base 444 is tightly but detachably secured to the body 40 of the manifold 4 using screws that extend via screw-holes in the annular hat into correspondingly located screw-bores in the body of the manifold 4 (not visible in the drawings). In alternatives, the trunk of the valve base 444 may be threaded such that the valve base 444 can be screwed into a correspondingly threaded bore defined within the body 40 of the manifold.

When in place as shown in FIG. 10, the valve head 441, the valve core 442, the valve shaft 443, the valve base 444, and the valve seat 445 are centred on and substantially aligned with the longitudinal valve axis V, and remain so during operation of the valve.

The second module 4b of the manifold 4 comprises a resin outlet plug 450b, which is fitted within the body 40 of the manifold in a similar manner to the valve base 444 in that a bore is formed within the body 40 of the manifold which receives the plug 450b. The resin outlet plug 450b comprises an externally-threaded surface which mates with a complementarily-threaded internal surface of the receiving bore. The bore and so the received resin outlet plug 450b are arranged and positioned below and directly opposite the valve base 444 such that rotation of the plug 450b axially displaces the plug 450b along the longitudinal valve axis V. An upper end of the resin outlet plug 450b defines the valve seat 445, and a lower end of the resin outlet plug 450b defines the resin outlet 45b. Moreover, and referring back to FIG. 9, the lower end of the resin outlet plug defines a barbed hose tail 451b suitable for coupling to a resin feed line hose (not shown) via a push-fit interference connection, wherein the hose is slipped over the hose tail 451*b*.

It should be noted that both the resin outlet plug 450*b* and the valve base 444 are reattachably detachable from the body 40 of the manifold 4 by withdrawing them from the body 40 along the valve axis V. Moreover, the shape and arrangement of the body 40, the plug 450*b*, and the valve base 444 constrains movement during detachment or attachment of the plug 450*b* and/or valve base 444 to movement along, or rotation about valve axis V. Advantageously, this ensures that the manifold is easily serviceable in the event that resin cures between the valve seat 445 and the valve head 441. For example, the resin outlet plug 450*b* can be manipulated from the outside of the manifold 4 with a tool (such as a spanner) to apply a force powerful enough to break the bond formed by the cured resin between the valve head 441 and the valve seat 445. This would typically far exceed the force that can be applied via a valve control mechanism. Furthermore, as the confronting surfaces of the valve seat 445 and valve head 441 are rotationally symmetrical about the valve axis V, their rotation relative to one another about the valve axis V will not interfere with one another.

The features and advantages described in respect of the second module 4*b* are generally present for every other module, and so will not be repeated in the interests of brevity.

The piston of each valve assembly is driven by the corresponding the valve control mechanism 46*a*-46*e*, such that the piston is linearly displaced relative to the corresponding valve seat. The distance between a valve head, and a confronting valve seat governs the rate of outflow of resin from the chamber 42 through the respective resin outlet 45*a*-45*e*. For example, in FIG. 9, the valve of the second module 4*b* is shown in a fully-open position, where the valve head 441 is positioned a substantial distance away from the corresponding valve seat 445 such that the valve head 441 has a negligible effect on fluid flow rate through the resin outlet 45*b*. In contrast, the valve of the first, third and fifth modules 4*a*, 4*c*, 4*e* are shown in a fully-closed position wherein the respective valve head and valve seat are abutting, and thus the valve is sealed against fluid flow through the corresponding resin outlet 45*a*, 45*c*, 45*e*. The valve of the fourth module 45*d* is shown in an intermediate partially-open position, which restricts, but does not prevent fluid flow through the fourth resin outlet 45*d*.

It is generally desirable to precisely control the separation between a valve head and a corresponding valve seat such that the flow rate through a respective resin outlet can be controlled in accordance. To this end, the valve control mechanisms 46*a*-46*e* in the present embodiment are in the form of electromechanical actuators. These are communicatively connected to the controller 11 as schematically represented in FIG. 9 via dashed lines extending between the controller 11 and each of the valve control mechanisms 46*a*-46*e*. The controller 11 is also communicatively connected to the manifold pressure sensor 43.

Each of the valve control mechanisms 46*a*-46*e* are configured to receive a respective valve control signal from the controller 11, and in response operate a respective valve thereby controlling the separation between the valve head and the valve seat of that valve. Accordingly, the outflow of resin from the chamber 42 via that valve can be independently controlled by the controller 11. Moreover, the controller 11 is able to dynamically adjust, over time, the outflow of resin via each valve.

Referring back to FIG. 1, each resin outlet 45*a*-45*e* is fluidly coupled to a respective resin feed line 5*a*-5*e* which, in turn, is fluidly coupled to a respective resin port 6*a*-6*e*.

Accordingly, the controller 11 is able to dynamically control the introduction of resin into the mould enclosure. Moreover, the controller 11 is also communicatively connected to the plurality of resin feed line pressure sensors 12*a*-12*e*, and so is arranged to receive pressure signals therefrom, and thus feedback about the resin pressure within each respective resin feed line 5*a*-5*e*. The resin feed line pressure sensors 12*a*-12*e* are positioned on the resin feed lines 5*a*-5*e* as far downstream of the manifold 4 as is practically possible in order to achieve a resin pressure reading that better represents the pressure of the resin on entry into the mould enclosure defined by the flexible sheeting 10 and the lower mould tool 8.

Figure 11:
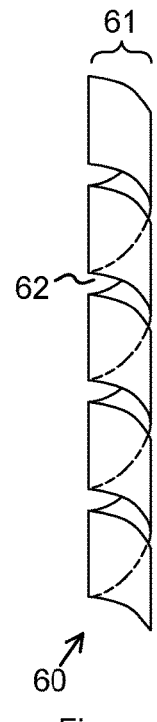
FIG. 11 is schematic partial view of a resin infusion spiral of the system according to the first embodiment.

Each elongate resin port 6*a*-6*e* in the present embodiment comprises a resin infusion spiral 60, an example of which is shown in FIG. 11. The resin infusion spiral is generally a spiral-wound plastic tube defining a relatively large hollow central channel 61 along which resin can flow from one end to the other at a relatively quick rate. Resin seeps from the central channel via the elongate spiral slit 62 defined by the tube, and thus serves to evenly distribute resin along the entire length of the spiral 60.

The use of the system 1 to produce the composite article, will now be described.

There are many parameters in determining an optimal set up and arrangement of the components of the system 1, including but not limited to:

The properties of the resin, such as its gas content and viscosity and how these properties changes over time, and in response to different environmental conditions (e.g. heat, exposure to UV light, vibration).

The properties of the fibre pack, such as its permeability.

The thickness of the fibre pack and variations in the thickness for a different regions of the article to be moulded.

Set-up/lay-up time.

Resin-spread time.

Cure time.

The shape and size of the article to be moulded.

The number, size and arrangement of resin ports and evacuation ports.

The power of vacuum and/or resin pump(s) employed.

Resin routing characteristics, such as resin feed line material, length and bore.

Pressure differential handling characteristics, such as material and thickness of sheeting.

Some of these properties may be inputted to the controller 11, or another computerised system, to build a digital model of at least part of the system 1, and this digital model can be used to virtually test how the parameters can be adjusted to achieve the most optimal trade-offs. The system 1 can therefore be configured by users in accordance with an arrangement determined via such modelling to be an optimal solution.

Nonetheless, the system 1 is generally set up as shown in FIGS. 1 and 2, with the fibre pack 9 sandwiched between the lower mould tool 8, and the flexible sheeting 10. It will be understood that additional materials, layers or components may be present as are well-known in the art to ensure the reliability of the resin transfer process, for example to achieve reliable vacuum sealing and to facilitate effective release of the finished composite article at the end of the resin transfer process. These may include, but are not limited to:

Resin flow meshes.
Release films/coatings.
Peel plies.
Core Materials
Pressure-sensitive tapes.
Connectors, manifolds or other fluid routing components.

Following on from initial set up, the vacuum pump is activated and so establishes a negative pressure within the mould enclosure via the evacuation ports 7a, 7b. Thus, the flexible sheeting 10 is drawn into the lower mould tool 8. As the fibre pack 9 is porous, the reduced pressure permeates throughout the mould enclosure, thereby evenly compacting the fibre pack 9. Additionally, pressure is reduced within the resin ports 6a-6e and respective resin feed lines 5a-5e. At this stage, the valves 44a-44e of the manifold 4 are all closed, and so no resin enters the feed line 5a-5e.

Typically, assuming standard atmospheric pressure of approximately 1 bar is present outside the mould enclosure, the interior of the mould enclosure, when the vacuum pump is activated, is typically expected to be in the region of 1-200 millibar.

A check is carried out to ensure that the mould enclosure is air-tight. This check may be carried out manually—for example, by listening for air hissing through punctures or imperfect seams of the flexible sheeting 10. However, this check can also be carried out or augmented via automated detection of air pressure variations within the mould enclosure. For example, the resin feed line pressure sensors 12a-12e and/or other pressure sensors may return to the controller 11 pressure signals that are symptomatic of low pressure loss. Furthermore, using multiple pressure sensors which are distributed across the mould enclosure can provide a general indication of the location of gaps in the mould enclosure. Accordingly, unwanted air-holes within or around the edges of the sheeting 10 can be readily identified and patched.

The resin transfer process can then be initiated. The start of the first period of the resin transfer process is depicted by FIGS. 1 and 2. At this stage, a first valve control mechanism 46a receives a valve control signal from the controller 11 to fully open the first valve 44a of the manifold 4. Additionally the controller 11 sends a pumping control signal to the resin pumping machine 2. This pumping control signal from the controller 11 includes a request to pump at a predetermined flow rate and/or pressure, and in response the resin pumping machine 2 controls the rate at which uncured resin and hardener are drawn from resin store 3, mixed in the appropriate proportions and then pumped to manifold 4.

The resin pumping machine 2 has internal flow rate and pressure monitoring and reporting capabilities and the controller 11 has access to and uses this information as part of a feedback loop to regulate the operation of the resin pumping machine 2. However, it will be appreciated that characteristics of the piping between the resin pumping machine 2 and the manifold 4 will determine the pressure internal to the manifold 4. For example, if a long, narrow-bored hose couples the resin pumping machine 2 to the manifold 4, then the pressure within the manifold 4 will be lower than if a short, wide-bored hose is used. Accordingly, it is important for the controller 11 to continually monitor the pressure internal to the manifold 4, and this is achieved via receiving a manifold pressure signal directly from the manifold pressure sensor 43. This too is used by the controller to as part of a feedback loop to regulate the operation of the resin pumping machine 2, and also the precise position of the valves 44a-44e of the manifold 4.

During the first period of the resin transfer process, resin is pumped from the resin pumping machine 2 to the manifold 4 and out through the first and only opened valve 44a of the manifold into the first resin feed line 5a. From there, the resin runs past the first resin feed line pressure sensor 12a, and into the first resin port 6a. As the resin runs towards and past the first feed line pressure sensor 12a, the pressure detected by the sensor 12a will increase.

The controller 11 receives the pressure signal from the first feed line pressure sensor 12a and registers the change in pressure. Moreover, if the detected pressure is determined by the controller to be above a predetermined threshold—for example, greater than 1 bar, then the controller 11 is configured to issue a control signal to progressively reduce the flow rate from the resin pumping machine 2, and/or progressively move the first valve 44a to restrict the flow rate and pressure within the first resin feed line 5a until the pressure is detected to be below the predetermined threshold. The first resin feed line pressure sensor 12a is located along the resin feed line 5a downstream of the manifold 4, but upstream of the first resin port 6a, and so the controller 11 acts to control the pressure of resin prior to its introduction into the manifold enclosure. Accordingly, relative to external atmospheric pressure, a negative pressure within the manifold enclosure is maintained before and during the feeding of resin via the first resin port 6a into the fibre pack 9.

As resin 20 flows into the mould enclosure, regions of otherwise dry fibre pack 9 become wetted by the resin. Assuming a relatively uniform thickness and density of fibre pack 9, its permeable nature and the incompressibility of the resin serves to ensure that the pressure of inflowing resin is evenly transferred to a boundary between wet and dry regions of the fibre pack 9—said boundary also referred to herein as the "resin front".

The permeability also ensures that the low pressure generated by the vacuum pump of the system 1 is substantially uniformly distributed throughout the dry region of the fibre pack 9. Accordingly, this together with the surface tension and viscosity of the resin generally ensure that the pressure difference across the resin front is even causing the resin front to expand evenly, effectively blooming radially-outward from its region of entry into the fibre pack 9.

Comparing FIGS. 1 and 2 (which represent the state of the system 1 at the start of the first period of the resin transfer process) with FIGS. 3 and 4 (which represent the state of the system at the end of the first period/start of the second period of the resin transfer process), it is shown how the resin front blooms outwards from the first resin port 6a. Ultimately, the progression of resin 20 is along a resin flow path from the first resin port 6a to a periphery of the fibre pack 9 where evacuation ports 7a, 7b are positioned.

Advantageously, the first resin port 6a is positioned at a central location relative to the overall mould enclosure. Accordingly, the resin front is able to expand outward from the resin port 6a, following a radial resin flow path and so wetting a larger volume of fibre pack 9 than would be otherwise be possible, for example if the first resin port were to be located at one extremity of the mould enclosure, and the evacuation port(s) at another.

Furthermore, and with specific reference to FIGS. 2 and 4, the first resin port 6a is advantageously situated at a nadir of the mould enclosure, forcing resin 20 to flow against the force of gravity as it fills into the fibre pack 9. This ensures that resin flow is restrained in a manner that prevents voids forming. Voids such as trapped air bubble islands are less likely to form as the low pressure air within dry regions of the fibre pack 9 has an air escape path towards the evacuation ports 7a, 7b upwards and outwards relative to the lower and centrally disposed first resin port 6a, and the associated pool of resin growing therefrom. In other words, this arrangement causes even spreading of the resin, such that all regions of the resin front face away from one another. This reduces the chance of two separate regions of the resin front meeting and forming a void behind them.

As the resin front expands from the state shown in FIGS. 3 and 4, the controller 11 continues the feedback loop of monitoring the pressure of the first resin feed line, and in response controlling the rate of resin flow into the mould enclosure via adjustment of the first valve 44a and/or the pump of the resin pumping machine 2. As well as keeping the pressure below a predetermined maximum, the controller 11 also keeps the pressure above a predetermined minimum to minimise the length of the resin transfer process.

Specifically, if the controller 11 receives a pressure control signal from the first resin feed line pressure sensor 12a that the resin pressure within that resin feed line 5a is above a predetermined maximum pressure threshold, then the controller 11 can issue a valve control signal to the first valve control mechanism 46a to reduce the separation between the valve head and valve seat of the corresponding first valve 44a. This causes the valve to restrict the flow of resin from the manifold 4 into the first resin feed line 5a, reducing the pressure in that feed line 5a, as can be continuously monitored by the controller 11 via the first resin feed line pressure sensor 12a. This causes downstream adjustment of resin flow via the first resin port 6a into the mould enclosure to be controlled in a manner that prevents the loss of negative pressure within the mould enclosure in the region of the first resin port 6a. When the controller 11 receives a pressure control signal from the first pressure sensor 12a to indicate that the resin pressure has dropped below the predetermined maximum pressure threshold, then the controller can issue a valve control signal to the first valve control mechanism 46a to maintain the separation between the valve head and valve seat of the first valve, and thereby maintain the rate of flow of resin 20 into the mould enclosure. When the controller 11 receives a pressure control signal from the first pressure sensor 12a to indicate that the resin pressure has dropped below the predetermined minimum pressure threshold, then the controller can issue a valve control signal to the first valve control mechanism 46a to increase the separation between the valve head and valve seat of the first valve, and thereby maintain the rate of flow of resin 20 into the mould enclosure. The arrangement and operation of the controller 11 is also naturally applicable to controlling resin flow via the other resin ports 6b-6e.

As stated, it is possible to also control the operation of the pump of the resin pumping machine 2. However, this will have a global effect on resin flow output via all partially or fully open valve 44a-44e. Accordingly, such control is generally only exercised under circumstances where it is determined by the controller 11 that resin flow should be increased or decreased globally for all non-closed valves 44a-44e.

The difference between the start and the end of the second period of the resin transfer process is illustrated by comparing FIGS. 3 and 4 with FIGS. 5 and 6 respectively. FIGS. 5 and 6 represent the state of the system 1 at the end of the second period/start of the third period of the resin transfer process.

As resin spreads from the first resin port 6a, the distance between that resin port and the resin front increases. As this distance increases, the rate at which resin 20 is drawn through the porous fibre pack gradually decreases over time. This is due to combination of factors, including hydrostatic pressure, increased fibre resistance, and also due to the curing of resin; the latter increasing the viscosity of the resin.

For many prior-known resin infusion techniques, this problem has been overcome by using a more powerful resin pump, vacuum pump, a lower viscosity resin, or lower density fibre pack. However, it has been determined by an inventor of the present invention that it is possible to maintain a reasonable infusion rate of resin by utilising a plurality of resin ports 6a-6e, each spaced from one another, and situated adjacent to the flow path.

This allow resin to be introduced into the mould enclosure via a new location such that the distance between a feeding resin port and the resin front can be reset, thereby resetting a relatively high rate of resin flow. However, for this approach to be effective, the resin ports should introduce resin to the mould enclosure at an appropriate juncture in the resin flow process to avoid voids forming. In particular, it is important to ensure that the resin front completely extends to or beyond any resin port subsequent to the first. In the present invention subsequent resin ports are the second, third, fourth and fifth resin ports 6b-6e.

For the controller 11 to automatically ensure that this condition is met, and control the valve positions accordingly, the controller 11 interfaces with the resin spread detector 15. In the present embodiment, the resin spread detector 15 is in the form of a camera system the components of which are positioned and arranged relative to the mould enclosure to visually detect the spread of resin through it—for example via a single wide-angle lens camera, or an array of overhead image detectors. As the flexible sheeting 10 is transparent or translucent, it is possible to for the camera system to automatically visually discriminate between dry and wet regions of the fibre pack 9; wet resin-infused regions of fibre pack 9 are generally darker in colour than dry regions. Nonetheless, in adaptions of the present system, the reliability of such a camera system may be enhanced by introducing a dye into the resin. Whilst the present embodiment employs one or more image detectors that operate in the visible light spectrum, it should be noted that image detectors operating in other spectrums are possible. Notably, an infrared image detector may be used.

In alternatives to the present invention, a different type of resin spread detector may be used. For example, the resin spread detector may be in the form of a matrix of capacitive sensors, placed on to the plastic sheeting 10. Again, these would be interfaced with the controller 11 and each would be configured to send to the controller 11 a signal to indicate whether or not resin is present at a specific location within the mould enclosure underneath a respective capacitive sensor. Advantageously, this approach does not rely on visual differentiation between wet and region regions of the fibre pack, and so the plastic sheeting 10 need not be transparent.

In yet a further alternative, the resin spread detector may comprise a pressure detector. This can have a dual purpose of detecting the spread of resin, and also determine the pressure of air and/or resin within the mould enclosure defined by the sheeting 10 and lower mould tool 8. In this alternative, it is envisaged that the spread and pressure detector extends through the sheeting 10, bridging the interior and exterior of the mould enclosure so as to detect a pressure differential between the interior and the exterior of the mould enclosure.

It is also possible in other alternatives for the controller 11 to automatically determine the position of the resin front relative to the subsequent resin ports without empirical detection of how far the resin has spread. This is possible through the use of resin spread parameters such as the time elapsed relative to the start of the first period of the resin transfer process (for example, monitored through the use of a timer accessible to the controller 11). Other resin spread parameters may include the resin flow rate (for example, communicated to the controller 11 from the resin pumping machine 2). Some resin spread parameters may be predetermined, or may be entered by an operator of the system in advance—for example, the volume of the fibre, the spacing of the resin ports, and the fibre density. Such resin spread parameters can be used to infer how far resin has spread.

Regardless of specific implementation, the controller 11 is thus configured to receive resin spread data, over the resin transfer process, the resin spread data indicating the position of resin within the mould enclosure relative to positions of the resin ports 6a-6e. The controller 11 is configured to make a determination about the position of the resin front relative to each resin port 6a-6e. In response to this determination, the controller 11 is configured to control the valves 44a-44e associated with each resin port 6a-6e. Specifically, any valve 44b-44e subsequent to the first valve 44a is not opened until the controller 11 determines that the resin front is at or has already passed the subsequent resin ports 6b-6e corresponding to said valve 44b-44e.

Referring again to FIGS. 5 and 6, it is illustrated therein that the resin 20 has spread entirely beyond the second resin port 6b, and the fourth resin port 6d, such that the fibre pack 9 at and directly underneath each resin port 6b, 6d is entirely infused with resin 20. Upon determining this condition, the controller 11 is configured to open the second valve 44b and the fourth valve 44d of the manifold 4, to cause resin to flow along the first, second and fourth resin feed lines 5a, 5b, 5d from the manifold 4 and into the mould enclosure via the respective resin port 6a, 6b, 6d. The extent to which the second and fourth valves 44b, 44d are opened is regulated by the controller 11 in response to the pressure signals received from the corresponding second and fourth pressure sensors 12b, 12d, in a manner akin to that already described in relation to the first valve 44a and first pressure sensor 12a. Thus, resin 20 can continue to be transferred into the mould enclosure, and with the introduction of resin 20 via the second and fourth resin ports 6b, 6d, the rate at which this occurs increases markedly at the start of the third period of the resin transfer process.

It will be understood that during the third period of the resin transfer process, the effective supply of resin via first valve 44a, feedline 5a and resin port 6a diminishes progressively due to the factors previously stated—for example curing of resin and increased resistance. Resin supply into the mould enclosure over the third period is provided principally by the second and fourth valves 44b, 44d and so it is accordingly advantageous for the controller 11 to be configured to close the first valve 44a. Doing so provides better flow control via the second and fourth valves 44b, 44d, at least because of the ability of the controller to govern flow rates globally via control of the pump in the resin pumping machine 2.

Figure 7:
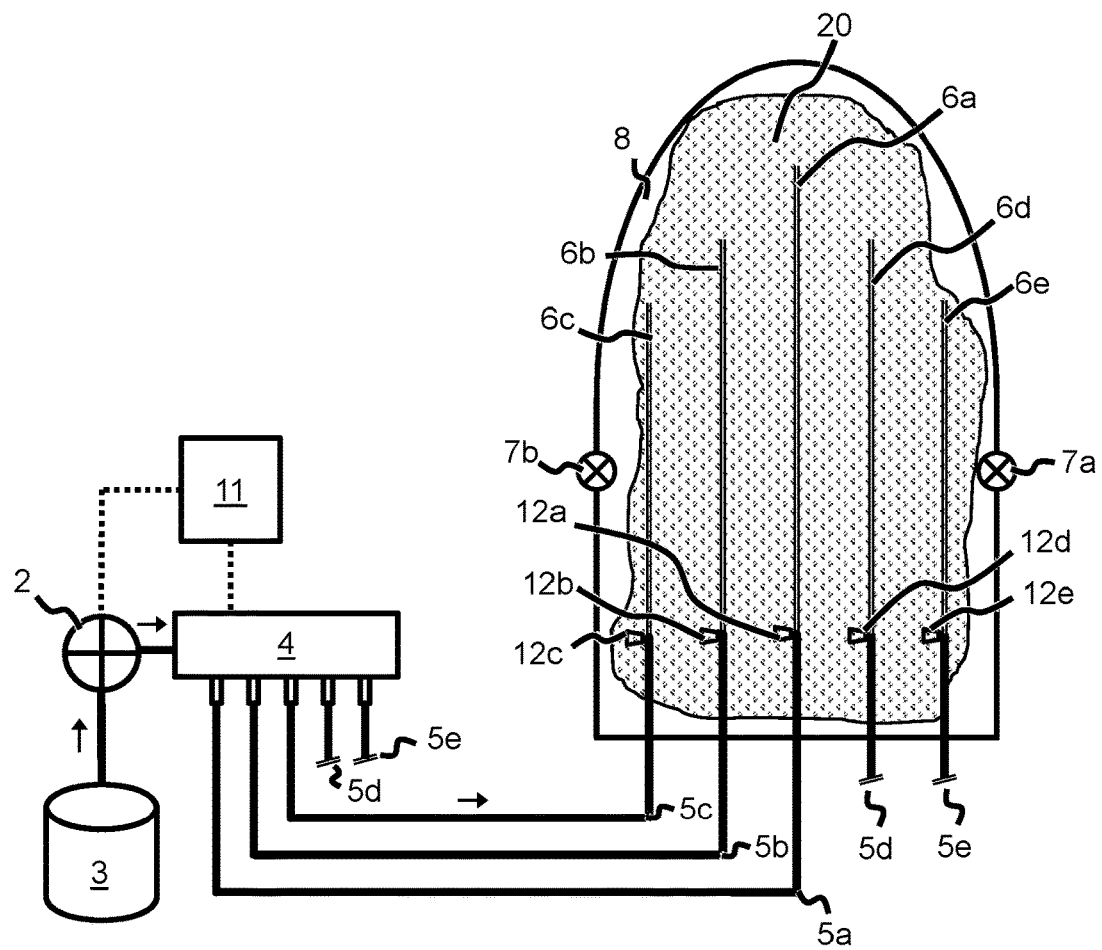
Figure 8:
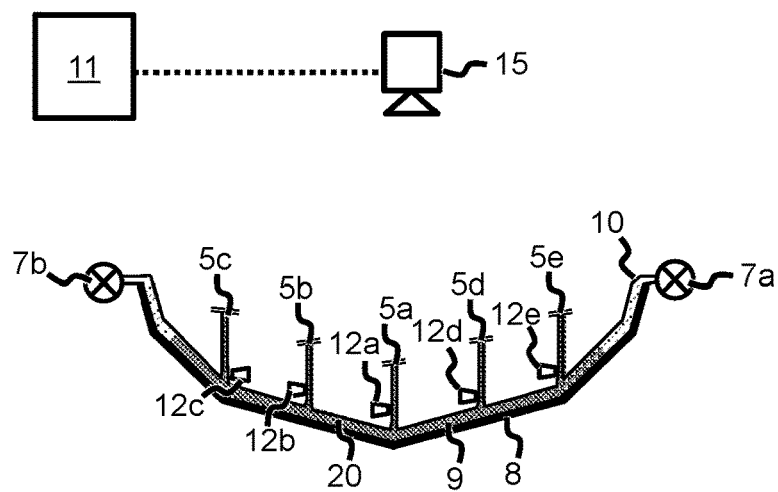

The difference between the start and the end of the third period of the resin transfer process is illustrated by comparing FIGS. 5 and 6 with FIGS. 7 and 8 respectively.

FIGS. 7 and 8 represent the state of the system 1 at the end of the third period/start of the fourth period of the resin transfer process, wherein the resin front extends beyond the third and fifth resin ports 6c, 6e. The controller 11 determines this condition via querying the camera system 15 as before and in response is configured to open the third and fifth valves 44c, 44e of the manifold.

Accordingly, resin 20 flows along the second, fourth, third and fifth resin feed lines 5b, 5d, 5c, 5e from the manifold 4 and into the mould enclosure via the respective resin port 6b, 6d, 6c, 6e. Again, the extent to which each valve is opened is regulated by the controller 11 in response to the pressure signals received from the corresponding pressure sensors, and resin continues to flow into the mould enclosure. Again, as resin 20 is introduced via resin ports that are close in distance to the resin front, the rate of resin flow into the mould enclosure increases markedly at the start of the fourth period of the resin transfer process. At the end of the fourth period of the resin transfer process, resin 20 reaches the evacuation ports 7a, 7b located at the extremity of the mould enclosure, and as such resin is completely infused throughout the fibre pack 9. Resin detectors may be located at or upstream one or more evacuation port(s), and may be arranged to communicate a signal to the controller 11 thereby to identify the end of the resin transfer process. In response, the controller 11 can issue a command to the resin pumping machine 2 to stop pumping resin, and may also issue a visible and/or audible alert to users to indicate the end of the resin transfer process. Nonetheless, additional time following the end of the resin transfer process is generally required for the curing and so hardening of the resin to form the composite article which is in this embodiment a boat hull.

Following the end of the resin transfer process, the resin pumping machine 2 and/or manifold 4 may be reused for the production of another composite article. In such a case, the resin pumping machine 2 and/or manifold 4 are decoupled from the other downstream components of the system used to produce the first article, and then recoupled to downstream components to form a similar system to produce a second article.

If continued and immediate reuse of the resin pumping machine 2 or manifold 4 is not required then internal parts of these components of the system 1 must be cleaned of resin, else be liable to irreversible damage via the hardening of that residual resin. This is generally achieved via flushing the internal parts that have been in contact with resin with a resin cleaning fluid—typically a solvent. Components such as the resin ports 6a-6e and resin feed lines 5a-5e are relatively low-cost, and so then hardening of resin therein is generally acceptable—such items are simply disposed of.

For the purpose of cleaning of the manifold 4 or resin pumping machine 2 the resin transfer system 1 preferably further comprises a solvent store, a solvent pump, and a solvent waste tank. Thus the resin transfer system 1 is able to undergo both a resin transfer process and a solvent flushing operation.

The solvent store, the solvent pump, and the solvent waste tank may be fluidly coupled to the resin pumping machine 2 and/or manifold 4 in a variety of configurations to ensure that the route taken by solvent is effective in ridding resin residue from these components.

For example, in a first solvent flushing operation wherein the resin pumping machine 2 and manifold 4 remain coupled to one another, the solvent store may be coupled via the solvent pump to an inlet of the mixing chamber of the resin pumping machine 2. Solvent is driven by the solvent pump through the mixing chamber, and further into the manifold 4 via the resin inlet 41. The resin outlets 45a-45e are fluidly coupled to the solvent waste tank.

In this first solvent flushing operation, the controller 11 is configured to regulate the flushing operation via control of the solvent pump, and also via control of the valves 44a-44e. In particular, to ensure that cleaning solvent runs all the way throughout the manifold 4, flooding all areas of the internal resin chamber 42, and moreover to flow across substantially all the internal surfaces of the manifold 4 previously in contact with resin, the controller 11 starts the first solvent flushing operation by running the solvent pump, and closing all but the fifth valve 44e of the manifold. As the fifth valve 44e is that which is located at the axial extremity of the manifold 4 that is remote from the resin inlet 41, this ensures that the solvent runs all the way through the internal resin chamber 42 of the manifold 4, and out through the open fifth valve 44e to the solvent waste tank. After a predetermined period, the controller 11 is configured to open the other valves 44a-44d of the manifold 4. Ideally, this is performed in a sequence wherein the valves located furthest from the resin inlet 41 are opened first. Additionally, as the next valve in the sequence is progressively opened, a previously-open valve in the sequence is progressively closed, thereby to maintain an adequate pressure and flow rate of cleaning solvent throughout the manifold 4, maximising the cleaning effect.

Simultaneous cleaning of both the resin pumping machine 2 and the manifold 4 may not be necessary or even desirable. For example, if a further resin transfer process is carried out that does not require multiple resin feed lines, then the resin pumping machine 2 and store 3 may be reused for that further resin transfer process, without the need for the manifold 4. At that stage it becomes necessary to clean the manifold 4 independently.

Accordingly, a second solvent flushing operation involves connecting the solvent store, solvent pump and solvent waste tank directly to the manifold 4. In particular, the solvent pump may be fluidly coupled directly to the resin inlet 41, and the controller 11 may be used in a manner described in relation to the first solvent flushing operation, to control opening of the valves in a sequence to maximise the efficacy of cleaning of the internal resin chamber 42 of the manifold 4.

In a variant to this second solvent flushing operation, the resin inlet 41 may be plugged, and the input from the solvent store and pump can be connected to the first resin outlet 45a. In this variant, at the start of the solvent flushing operation, the controller 11 is configured to open the first and fifth valves 44a, 44e, and close the second, third and fourth valves 44b, 44c, 44d thereby to ensure that cleaning solvent runs across the extent of the internal resin chamber 42, albeit via a different path to that previously described. Accordingly, solvent is pumped at pressure and routed between the two modules 4a, 4e located at the ends of the manifold.

Each of these solvent flushing operations assumes manual decoupling of the resin pumping machine 2 and/or manifold 4 from the downstream components of the system 1, and then recoupling of the resin pumping machine 2 and/or manifold 4 to the solvent store, pump and waste tank. However, it will be understood that the system 1 can be configured to allow automatic transition from a resin transfer process to a solvent flushing operation via a suitable network of fluid lines, branch connectors and switch valves, the latter being controllable via the controller 11. For example, the controller 11 may be configured to control a first set of switch valves to direct fluid to the resin pumping machine 2 from a resin store, and a second set of switch valves to direct fluid outputted by the manifold 4 along resin feed lines during a resin transfer process. The controller 11 may then be configured to alter the position of the first set of switch valves to direct fluid to the resin pumping machine 2 instead from a solvent store, and the second set of switch valves to direct fluid outputted by the manifold 4 instead to a solvent waste tank when the system 1 transitions from the resin transfer process to a solvent flushing operation.

In general, the first set of switch valves are typically upstream of the resin pumping machine 2 and/or the manifold 4, and the second set of switch valves are typically downstream of the resin pumping machine 2, and/or the manifold 4.

A resin transfer system for use in a resin transfer process and a solvent flushing operation each according to embodiments of the present invention has thus been described with reference to FIGS. 1 to 11. However, it is evident that many alternatives, modifications and variations will be apparent to those skilled in the art.

For example, the system may be alternatively configured to improve the resin transfer process. By way of example, the resin pumping machine 2 is described above as being capable of being regulated by the controller 11 such that a pumping control signal can govern a predetermined flow rate and/or pressure. In certain variations, the resin pumping machine 2 may have the capability of being operated in reverse so as to impose a negative flow rate and/or pressure downstream of the resin pumping machine 2. This mode of operation may be initiated by the controller 11 for example, in response to detecting a sudden and unexpected loss of power to the vacuum pumps, and so a loss of negative pressure, relative to atmospheric pressure, within the mould enclosure. Such a condition would normally cause decompaction of the fibre pack, adversely affecting the resin transfer process. However, the provision, via the resin pumping machine 2 of a negative flow rate and/or pressure can maintain fibre pack compaction in such exceptional circumstances.

In particular, during a resin transfer process, the system 1 can be configured so that the controller 11 is in communication with pressure sensors, such as the resin feed line pressure sensors 12a-12e or the manifold pressure sensor 43. The controller is configured to receive a signal from such pressure sensors that allows the controller to infer the pressure within the mould enclosure. In response to inferring that the pressure within the mould enclosure is too high, or is increasing too quickly, the controller 11 is configured to send a pumping control signal to the resin pumping machine 2 to reduce the flow rate of resin into the mould enclosure. This encompasses a situation where the initial flow rate is zero (e.g. pumping stopped), and thus the subsequent flow rate requested by the controller, and produced by the pumping machine 2 is negative.

In practice, the capability of components such as resin pumping machines 2 can vary significantly. Some may have the ability to reverse flow (and may include a purge channel to direct the already-mixed backward-flowing resin to a waste or temporary storage tank).

Other resin pumping machines may be of a simple "on-off" type, with one pumping speed, and an inability to reverse flow. To accommodate for this, the system 1 may be alternatively configured to provide similar flow/pressure control functionality via the addition of a flow control apparatus as will now be described.

Figure 12:
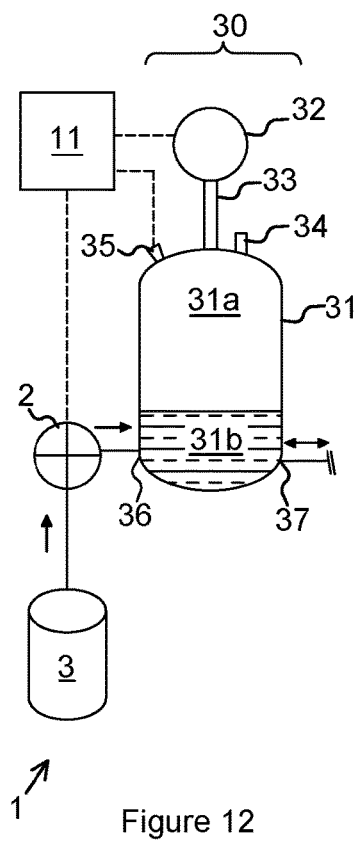
FIG. 12 is a schematic view of a part of the resin transfer system of FIG. 1 in an alternative configuration that includes a flow control apparatus.

FIG. 12 is a schematic view of a part of the resin transfer system of FIG. 1 in an alternative configuration that includes an example flow control apparatus 30 for controlling resin flow and thus pressure within system components such as the mould enclosure.

Notably, the retained capability of imposing negative flow and/or pressure can be achieved downstream of the resin pumping machine 2, and independently of the operation of the resin pumping machine 2.

It should be understood that components of the system 1, such as the manifold 4 and resin feed lines 5a-e are present in the alternative configuration of the system 1 of FIG. 12, but are merely omitted from FIG. 12 for brevity. Similarly, data connections between the components shown in FIG. 12 (such as the controller 11 and the pressure sensors 12a-12e) are also present, even if not schematically represented in FIG. 12.

The flow control apparatus 30 comprises a container 31, a gas pump 32, a pressure release safety valve 34, a gas pressure sensor 35, a resin input 36, and a resin output 37. The resin input 36 and resin output 37 are located near a base of the container, the resin input 36 being fed resin by the resin pumping machine 2, and the resin output 37 being fluidly coupled to the manifold (not shown). In alternatives configurations, the resin output 37 may not necessarily be connected to the manifold 4, but instead be connected directly to a mould enclosure.

The gas pump 32 is coupled via a gas duct 33 to the container 31. Moreover, the gas duct 33 is connected at a head of the container 31 such that the gas pump 32 is fluidly connected with an upper interior headspace 31a defined by the container 31. The gas pressure sensor 35 and safety valve 34 are also located at the head of the container 31.

The controller 11 is communicatively connected to the gas pump 32 so that data can pass between them. Specifically, the gas pump 32 can receive operation instructions from the controller 11, and report back to the controller 11 status information about the operation of the gas pump 32. Similarly, the controller 11 also has a data connection to the gas pressure sensor 35 so that the controller 11 can receive from the gas pressure sensor a gas pressure signal representative of the gas pressure within the interior of the container 11. More precisely, the gas pressure signal may relate to the pressure differential between the external environment and that of the interior headspace 31a of the container 31. As the external environment is typically at a pressure of 1 atmosphere, then a "negative pressure" within the headspace 31a is that which is below 1 atmosphere, and a "positive pressure" within the headspace 31a is that which is above 1 atmosphere. Naturally, the container is sealed to prevent unintentional gas pressure leakage.

The gas pump 32 is of a type which can draw gas out of the container 31 via the gas duct 33, thereby creating a negative pressure within the headspace 31a relative to atmospheric pressure, or force gas into the container 31 thereby creating a positive pressure within the headspace 31a relative to atmospheric pressure.

The gas pump 32 may be embodied by combining an air compressor and a vacuum device together. Both are connected to the gas duct 33 and are alternately operable to drive gas (typically in the form of air) into or out from the container 31 via the gas duct 33. Naturally, in such an implementation, gas valves are also be provided that prevent unintentional gas seepage across the air compressor or vacuum device when they are not activated.

In use, the resin pumping machine 2 pumps resin into the container 31 via the resin input 36 causing a volume of resin 31b to build up within the interior of the container 31 from its base upwards. The volume of resin and the volume of gas are in fluid communication with one another and so as the volume of resin 31b increases the corresponding volume of the gas in the headspace 31a decreases. The gas pump may be activated during this period to draw gas out of the headspace 31a thereby to prevent pressure increase in the headspace 31a as its effective volume decreases. The volume of resin 31b effectively creates a resin buffer between the resin pumping machine 2 and the mould enclosure.

Activation of the vacuum pumps of the system 1, acting via the evacuation ports 7a, 7b, generate a negative pressure within the mould enclosure. If a fluid path is open between the mould enclosure and the resin output 37, then resin is drawn out of the container 31.

It is desirable to match the rate of flow of resin into and out of the container 30 so that the volume of resin 31b within the container 31 can be kept relatively constant. To this end, the controller 11 may be connected to a resin level sensor (not shown) so that the controller 11 can maintain the resin level within the container 31, for example, by controlling the pumping speed of the resin pumping machine 2.

Importantly, the pressure and/or flow rate of resin from the resin output 37 to the mould enclosure can also be governed by the gas pump 32. A negative pressure generated by the gas pump 32 within the headspace 31a of the container 31 slows down the flow rate of the resin leaving the container 31 via the resin output 37. This also decreases the pressure of the resin on first entry into the mould enclosure. Significantly, this means that a negative pressure, relative to atmospheric pressure, can be provided both at the very downstream end of the mould enclosure (via the vacuum pumps) and also at the very upstream end of the mould enclosure (via the flow control apparatus). This ensures that the fibre pack 9 remains compressed along its entire length, with the flexible sheeting 10 being urged towards the lower mould tool 8 by the pressure differential between the external environment and all parts of the interior of the mould enclosure. Whilst the pressure within the mould enclosure at both the resin feed line(s) and the evacuation ports 7a, 7b is negative relative to external atmospheric pressure, so long as the pressure at the downstream end of the mould enclosure is maintained at a more negative pressure than the upstream end, resin will flow downstream. To this end, it is preferred that two pressure sensors, one at the upstream end (such as the gas pressure sensor 35) and the other at the downstream end, are used to provide feedback to the controller 11 about the pressure at each respective location within the manifold. In response, the controller 11 can be used to adjust the operation of the gas pump 32.

Advantageously, this ensures that the resulting resin transfer process is more reliable.

This is of particular use where parameters of the system 1 such as described above (e.g. low resin viscosity, or high fibre pack permeability) can lead to relatively high flow rates. This is typical at the start of the resin transfer process, and results in relatively high pressure within the mould enclosure and so undesirable fibre pack 9 decompaction.

Additionally, as a buffer is established within the container 31 of both a volume of resin 31b, and also a volume of low pressure within the headspace 31a, this provides a convenient way to instantaneously control the response of the system 1 during an unexpected event, for example the sudden loss of power to a vacuum pump.

In such an event, due to the low pressure within the headspace 31a, resin flow via the resin output 37 is immediately affected. The flow can reverse, thereby sucking resin back into the container 31 from the mould enclosure to retain the overall negative pressure within the mould enclosure, and so maintaining fibre pack 9 compaction. Notably, this effect can be achieved even if the resin pumping machine 2 continues to pump resin into the container 31 via the resin input 36. Thus, fibre compaction can be maintained even if there is a lag between detecting a problem, issuing a command to stop pumping resin, and the resin pumping machine 2 finally responding.

Naturally, as the resin transfer process enters a stage where flow rate into the mould enclosure has slowed significantly, in response, the pressure established within the headspace 31a of the container 31 by the gas pump 32 can be controlled to become less negative relative to atmospheric pressure. Moreover, the gas pump 32 can be switched to a mode of operation where gas is driven into the container 31 via the gas duct 33 and so the pressure within the headspace 31a becomes positive relative to atmospheric pressure. This can increase flow rates of resin into the mould enclosure without risking loss of fibre compaction under certain conditions (for example, during relatively higher resin viscosity and/or lower fibre permeability). The negative pressure within the mould enclosure can be maintained sufficiently by the vacuum pumps at the downstream end under such conditions.

Thus, the flow control apparatus 30 provides better control over resin and gas pressure and flow rate to the advantage of the resin transfer process according to present embodiments of the invention.

It should be noted that the flow control apparatus 30 itself may take on other forms. For example, in alternative configurations, the container 31 of the flow control apparatus 30 may be big enough to hold a sufficient volume of resin to produce a composite article. In such a situation, the flow control apparatus 30 need not be connected to a resin pumping machine 2 to continuously receive resin from it for use in the resin transfer process. Rather, the container 31 of the flow control apparatus can be pre-filled with a sufficient quantity of resin for the article to be produced, and the pressure within the headspace 31a controlled in the manner described above to conduct the resin transfer process. Advantageously, this arrangement means it is not necessary to regularly monitor and top up the level of resin within the container 31.

The flow control apparatus 30 can also be applied to other variations of the system 1. For example, variations of the system without a manifold, or without multiple resin lines may take advantage of the flow control apparatus 30 described above, and shown in FIG. 12. Notably, the resin output 37 can be directly connected to a single resin feed line located at an upstream end of the mould enclosure, and a vacuum pump 7a connected to a corresponding downstream end.

Additional alternatives, modifications and variations of the above-described embodiments will be apparent to those skilled in the art. For example, whilst the systems described above is particularly suited to the vacuum-assisted resin transfer moulding of an article using flexible sheeting as an upper mould tool, it will be understood that the upper mould tool may be rigid or semi-rigid. Where both the upper and lower tool are rigid, it is possible for the system to omit the use of a vacuum pump for drawing resin through the fibre pack (and/or, in some variants, in assisting in the urging of the mould tools together in a sealing arrangement); in such a case, only a resin pump is used to drive resin throughout the fibre pack. Accordingly, gas displaced by the resin introduced into the fibre pack is not actively drawn out via a vacuum pump, but rather escapes from the evacuation port(s) under action of that displacement.

The first embodiment describes the use of a controller which may be provided, as described, as a single separate unit. In alternatives, the functionality provided by the controller may be distributed across a network of control devices in communication with one another. For example, the controller may take the form of a terminal local to the resin pumping machine, the terminal being in communication with a central server from which commands and instructions are routed to the other components of the system. The controller may be embodied as a Field Programmable Gate Array (FPGA).

In further alternatives, the valves that control resin flow through a corresponding set of resin ports may not necessarily be provide as part of a manifold. For example, a valve may be provided along each resin feed line fed directly from the resin pumping machine. In such an alternative, it is envisaged that a valve control mechanism associated with each valve is communicatively connected to the controller such that the controller can, through operation of each respective valve control mechanism adjust resin flow independently through each resin feed line, and so control resin outputted via each resin port.

In the first embodiment, each valve comprise a piston that is linearly displaceable under action of a valve control mechanism. However, the valves and/or valve control mechanisms may take on different forms. For example, an alternative valve may be in the form of a peristaltic valve which acts to crush a resin feed line to close the valve, and release the resin feed line to allow throughput of resin pumped from the resin pumping machine. Here, the valve control mechanism may be in the form of a stepper-motor which drives a cam that is urged against or away from a resin feed line. The advantage with peristaltic valves is that the valve itself is not exposed to resin, and so does not require cleaning. Such an alternative is also conveniently compatible with the alternative of having no manifold.

The first embodiment concerns the transfer of resin into a glass fibre pack. However, it will be understood that other fibre packs, in particular carbon fibre may be used. Similarly, a variety of different resin types may be used. A thermosetting resin is generally preferred, and for example, may be composed of epoxy, phenolic, polyester or vinylester. However, other resins are also possible.

The system may also be provided with additional components as are known in the art. These may include transducers—for example, resin heaters may be provided at the resin pumping machine 2, and temperature control may be governed by the controller 11 to adjust properties of the resin such as viscosity and cure time. Furthermore, additional components may include sensors—for example, temperature sensors. Again, these may be in communication with the controller 11 to allow monitoring of the conditions under which the resin transfer process and/or solvent flushing operations are carried out.

Additionally, the layout of the components of the system may be varied to account for differences in composite articles to be manufactured. For example, whilst the resin ports are shown in FIGS. 1, 3, 5 and 7 to be a set of elongate ports that extend linearly, and are parallel and spaced from one another, other configurations are also possible. For example, the resin ports may branch from one another, or follow curvilinear paths. In will be appreciated, however, that linearly-extending resin ports are advantageous in that they are easier to reliably fit to the mould enclosure.

The position of the components of the system may be different in other alternatives. For example, the position of pressure sensors may be different. In the first embodiment, the resin feed line pressure sensors 12a-12e are positioned along the resin feed lines as far downstream of the manifold 4 as is practically possible in order to achieve a resin pressure reading that better represents the pressure of the resin on entry into the mould enclosure defined by the flexible sheeting 10 and the lower mould tool 8. However, it will be understood that the pressure sensors may be located even further downstream, registering the resin and/or air pressure within the mould enclosure. Alternatively, the pressure sensors may be located closer to, or at the manifold 4. The latter presents the advantage of reduced wiring to such sensors, but the disadvantage of having a less accurate representation of the pressure on entry into the mould enclosure. Naturally, in further alternatives, sensors such as these pressure sensors may be wireless, and may have a localised power source, thereby obviating the need for data and/or power wiring.

The resin transfer process according to the first embodiment has four periods that generally last approximately the same amount of time as one another. Depending on the size of the composite article to be formed via the first or other embodiments, and other factors such as the property of materials used, each period may typically last between 1 to 100 minutes.

Nonetheless, it is intended to embrace all such alternatives, modifications and variations that fall within the scope of the appended claims.

The invention claimed is:

1. A system for vacuum-assisted resin transfer moulding of composite articles, the system comprising:
   a mould enclosure enclosing a fibre pack;
   an evacuation port located at a periphery of the fibre pack, the evacuation port being coupled to a vacuum pump operable during a resin transfer process to evacuate air from the mould enclosure to establish a negative pressure therein relative to an external pressure external to the mould enclosure;
   a plurality of resin ports distributed across the mould enclosure, the plurality of resin ports being spaced from one another and positioned in a sequence along a resin flow path within the fibre pack;
   a plurality of valves, each of the plurality of valves being arranged configured to control resin ingress into the fibre pack through a respective one of the plurality of resin ports;
   a plurality of valve control mechanisms, each of the plurality of valve control mechanism being configured to receive a respective valve control signal and in response operate a corresponding one of the plurality of valves;
   a controller configured to transmit the valve control signals to each of the plurality of valve control mechanisms, wherein the controller is configured:
      prior to the start of a first period of the resin transfer process, to close each of the plurality of valves to prevent ingress of resin into the fibre pack via the resin ports, and to establish the negative pressure within the mould enclosure;
      at the start of the first period of the resin transfer process, to open a first of the plurality of valves corresponding to a first resin port located at the start of the resin flow path to permit ingress of resin into the fibre pack via the first resin port; and
      after the end of the first period of the resin transfer process, to open at least another of the plurality of valves to permit resin ingress into the fibre pack via at least another of the resin ports positioned subsequent to the first resin port in the sequence, resin ingress via the at least another of the subsequent resin ports being in order of the position in the sequence of the at least another of the subsequent resin ports along the resin flow path; and
   a camera system having at least one image detector positioned and arranged relative to the mould enclosure to detect the presence of resin within the mould enclosure for detecting spread of resin within the fibre pack, the camera system being configured to communicate resin spread data to the controller, the resin spread data indicating the detected position of resin relative to the position of the at least another of the subsequent resin ports,
   wherein:
      the controller is further configured to delay ingress of resin via the at least another of the subsequent resin ports until the controller determines that a resin front originating from the first resin port in the sequence, and progressing along the resin flow path through the fibre pack during the resin transfer process, has at least substantially reached the position of the at least another of the subsequent resin ports in the sequence, and
      the controller is further configured to use the resin spread data to make a determination whether a resin front has at least substantially reached the position of a respective subsequent resin port.

2. The system of claim 1, wherein the controller is further configured to determine a position of the resin front relative to the at least another of the subsequent resin ports by determining at least one resin spread parameter, the at least one resin spread parameter including at least one of: time elapsed relative to the start of the first period of the resin transfer process, resin flow rate, fibre volume between adjacent resin ports, and fibre density.

3. The system of claim 1, further comprising a manifold, the manifold comprising the plurality of valves and a body, the body defining a resin inlet, a plurality of resin outlets and an internal resin chamber therebetween, wherein:
   each resin outlet is fluidly coupled to a corresponding one of the resin ports; and each valve is arranged to control flow of resin between the internal resin chamber and a corresponding one of the outlets, thereby controlling resin ingress into the fibre pack through a respective one of the resin ports.

4. The system of claim 3, wherein each of the plurality of valves comprises a valve head and a valve seat which are slidable relative to one another along a valve axis to control flow between the internal resin chamber and a corresponding one of the outlets, with abutment of the valve head and the valve seat stopping flow, and an extent of separation of the valve head and the valve seat being proportional to a size of the opening between the internal resin chamber and a corresponding one of the outlets.

5. The system of claim 4, wherein at least one of the valve head and the valve seat of a respective valve is reattachably detachable from the body of the manifold by withdrawing the at least one of the valve head and valve seat from the body by moving it along the valve axis.

6. The system of claim 3, wherein the manifold is formed from a plurality of modules that are detachably attachable and sealable to one other via cooperating interfaces, each module comprising a respective resin outlet, a corresponding valve, and a section of the body defining the internal resin chamber.

7. The system of claim 3, wherein the manifold further comprises a manifold pressure sensor for registering the pressure within the internal resin chamber, the manifold pressure sensor being arranged to communicate the registered pressure to the controller, and in response, the controller being configured to transmit valve control signals to regulate the flow of resin into the fibre pack via the plurality of valves.

8. The system of claim 1, wherein at least one of the valve control mechanisms is arranged to receive a respective valve control signal and in response operate a corresponding one of the valves to maintain it in one of: a fully open state, a fully closed state, and at least one partially open state, the at least one partially open state.

9. The system of claim 8, wherein each valve is continuously variable between the fully-closed and fully-open states.

10. The system of claim 1, wherein the first resin port is positioned at a central location relative to the overall mould enclosure, such that the resin flow path extends radially outward from the first resin port to a periphery of the fibre pack; and
    wherein the first resin port is positioned at a nadir of the mould enclosure, such that the resin flow path extends substantially upward, forcing resin flowing into the fibre pack during the resin transfer process to flow against the force of gravity.

11. The system of claim 1, wherein the controller is arranged to determine a pressure state within the mould enclosure and in response transmit valve control signals to control resin ingress into the fibre pack at a flow rate that substantially maintains the negative pressure within the mould enclosure.

12. The system of claim 1, further comprising a resin pump, the resin pump being arranged to pump resin into the mould enclosure via the respective plurality of resin valves and ports, wherein:
    the controller is in communication with the resin pump, and
    the controller is arranged to control the resin pump thereby regulating ingress of resin pumped by the resin pump into the fibre pack within the mould enclosure.

13. The system of claim 1, further comprising a solvent pump and having a cleaning configuration in which the solvent pump drives cleaning solvent from a solvent store via the plurality of valves to a solvent waste tank, thereby preventing resin curing within the valves and so maintaining the ability of the valves to open and close.

14. The system of claim 1, further comprising a mixing chamber arranged, during the resin transfer process, to receive and mix together an uncured resin and a hardener to thereby output resin suitable for transfer into the fibre pack.

15. A system for vacuum-assisted resin transfer moulding of composite articles, the system comprising:
    a manifold comprising a body and a plurality of valves, wherein the body of the manifold defines a resin inlet, a plurality of resin outlets and an internal resin chamber therebetween, and wherein each of the plurality of valves is arranged to control flow between the internal resin chamber and a corresponding one of the resin outlets;
    a plurality of valve control mechanisms, each of the plurality of valve control mechanisms being arranged to receive a respective valve control signal and in response operate a corresponding one of the valves of the manifold;
    a controller configured to transmit valve control signals to each of the plurality of valve control mechanisms, the controller configured:
        prior to the start of a first period of a resin transfer process, to close each of the plurality of valves to prevent resin egress via the resin outlets;
        at the start of the first period of the resin transfer process, to open a first of the valves corresponding to a first resin outlet to permit egress of resin via the first resin outlet; and
        after the end of the first period of the resin transfer process, open at least another of the valves to permit resin egress via at least another of the resin outlets, subsequent to the first resin outlet; and
    at least one capacitive sensor, positioned adjacent to the internal resin chamber along the resin flow path at a predetermined location relative to at least one of the resin outlets for detecting spread of resin within the internal resin chamber, the at least one capacitive sensors being configured to communicate resin spread data to the controller, the resin spread data indicating the detected position of resin relative to the position of the at least one of the resin outlets,
    wherein:
        the controller is configured to delay ingress of resin via the at least another of the resin outlet until the controller determines that a resin front originating from the first resin outlet has at least substantially reached a predetermined position corresponding to the at least another of the resin outlets subsequent to the first resin outlet, and
        the controller is further configured to use the resin spread data to make a determination whether a resin front has at least substantially reached the position of at least one of the resin outlets.

16. A system for vacuum-assisted resin transfer moulding of composite articles, the system comprising:
    a mould enclosure enclosing a fibre pack;
    an evacuation port located at a periphery of the fibre pack, the evacuation port being coupled to a vacuum pump operable during a resin transfer process to evacuate air from the mould enclosure to establish a negative pressure therein relative to an external pressure external to the mould enclosure;
    a plurality of resin ports distributed across the mould enclosure, the plurality of resin ports being spaced from one another and positioned in a sequence along a resin flow path within the fibre pack;
    a plurality of valves, each of the plurality of valves being arranged configured to control resin ingress into the fibre pack through a respective one of the plurality of resin ports;
    a plurality of valve control mechanisms, each of the plurality of valve control mechanism being configured to receive a respective valve control signal and in response operate a corresponding one of the plurality of valves;
    a controller configured to transmit the valve control signals to each of the plurality of valve control mechanisms, wherein the controller is configured:
        prior to the start of a first period of the resin transfer process, to close each of the plurality of valves to prevent ingress of resin into the fibre pack via the resin ports, and to establish the negative pressure within the mould enclosure;
        at the start of the first period of the resin transfer process, to open a first of the plurality of valves corresponding to a first resin port located at the start of the resin flow path to permit ingress of resin into the fibre pack via the first resin port; and after the end of the first period of the resin transfer process, to open at least another of the plurality of valves to permit resin ingress into the fibre pack via at least another of the resin ports positioned subsequent to the first resin port in the sequence, resin ingress via the at least another of the subsequent resin ports being in order of the position in the sequence of the at least another of the subsequent resin ports along the resin flow path; and at least one resin spread detector for detecting spread of resin within the fibre pack, the at least one resin spread detector being configured to communicate resin spread data to the controller, the resin spread data indicating the detected position of resin relative to the position of the at least another of the subsequent resin ports, wherein:

the controller is further configured to delay ingress of resin via the at least another of the subsequent resin ports until the controller determines that a resin front originating from the first resin port in the sequence, and progressing along the resin flow path through the fibre pack during the resin transfer process, has at least substantially reached the position of the at least another of the subsequent resin ports in the sequence, the controller is further configured to use the resin spread data to make a determination whether a resin front has at least substantially reached the position of a respective subsequent resin port, and the controller is further configured to determine a position of the resin front relative to the at least another of the subsequent resin ports by determining at least one resin spread parameter, the at least one resin spread parameter including at least one of: time elapsed relative to the start of the first period of the resin transfer process, resin flow rate, fibre volume between adjacent resin ports, and fibre density.

* * * * *